United States Patent
Kimura

(10) Patent No.: US 8,714,298 B2
(45) Date of Patent: May 6, 2014

(54) PUMP APPARATUS

(75) Inventor: Makoto Kimura, Yokohama (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 533 days.

(21) Appl. No.: 12/773,426

(22) Filed: May 4, 2010

(65) Prior Publication Data
US 2010/0322807 A1 Dec. 23, 2010

(30) Foreign Application Priority Data

Jun. 19, 2009 (JP) ................................. 2009-145934

(51) Int. Cl.
*F04C 14/22* (2006.01)
*B62D 5/065* (2006.01)

(52) U.S. Cl.
USPC ................ 180/441; 417/26; 417/213; 701/41

(58) Field of Classification Search
USPC ............ 180/417, 421, 422, 441, 442; 701/41, 701/42, 30.7; 340/437; 417/26, 29, 213; 418/16
See application file for complete search history.

(56) References Cited

U.S. PATENT DOCUMENTS

| | | | |
|---|---|---|---|
| 5,765,116 A * | 6/1998 | Wilson-Jones et al. | ......... 701/41 |
| 6,524,076 B2 | 2/2003 | Konishi | |
| 6,736,604 B2 | 5/2004 | Okada et al. | |
| 6,845,310 B2 | 1/2005 | Shimizu et al. | |
| 2001/0036412 A1 | 11/2001 | Konishi | |
| 2002/0192081 A1 | 12/2002 | Okada et al. | |
| 2003/0144782 A1 | 7/2003 | Shimizu et al. | |
| 2007/0083308 A1 * | 4/2007 | Hara | ............................... 701/41 |

FOREIGN PATENT DOCUMENTS

| | | |
|---|---|---|
| DE | 101 20 252 A1 | 1/2002 |
| DE | 102 27 149 A1 | 1/2003 |
| DE | 10 2004 027 903 A1 | 8/2005 |
| JP | 03-112776 A | 5/1991 |
| JP | 08-230706 A | 9/1996 |
| JP | 09-175417 A | 7/1997 |
| JP | 2003-072569 A | 3/2003 |
| JP | 2003-285748 A | 10/2003 |
| JP | 2004-218527 A | 8/2004 |

\* cited by examiner

*Primary Examiner* — Anne Marie M Boehler
(74) *Attorney, Agent, or Firm* — Foley & Lardner LLP

(57) ABSTRACT

A pump apparatus includes a pump housing; a drive shaft; a pump element; a cam ring arranged to vary an inherent discharge amount based on the eccentric amount of the cam ring; a steering state sensing section configured to sense or estimate a steering angle, a steering angular speed or a steering angular acceleration, and to output the steering angle, the steering angular speed or the steering angular acceleration as a steering state sensing signal; and a solenoid configured to be controlled to suppress the eccentric amount of the cam ring so as to decrease the inherent discharge amount with respect to the steering state sensing signal when the vehicle speed is equal to or greater than a first predetermined vehicle speed, relative to the inherent discharge amount when the vehicle speed is smaller than the first predetermined vehicle speed.

11 Claims, 14 Drawing Sheets

PUMP APPARATUS

BACKGROUND OF THE INVENTION

This invention relates to an improvement of a pump apparatus used as a hydraulic source of a steering apparatus of a vehicle.

U.S. Pat. No. 6,845,310 (corresponding to Japanese Patent Application Publication No. 2003-285748) discloses a conventional pump apparatus that a steering apparatus for a vehicle employs. This pump apparatus is configured to determine a basic current command value based on a current command value according to a steering angle sensed by a steering angle sensor, a current command value according to a steering angular speed calculated based on the steering angle, and a current command value according to a vehicle speed sensed by a vehicle speed sensor, to add a standby current command value to this basic current command value, and to output the summation of the standby current command value and the basic current command value as a solenoid current command value. A standby flow rate based on the standby current command value is always ensured. With this, it is possible to prevent seizure of the steering apparatus, and to improve responsiveness of the steering apparatus. Moreover, it is possible to oppose the disturbance such as kickback and self aligning torque.

SUMMARY OF THE INVENTION

However, in the conventional pump apparatus, for example, at the straight-ahead running in the middle and high speed region, the steering angle and the steering angular speed is frequently increased based on the steering angle operation generated by the disturbance such as the slight steering operation and the kickback. The flow rate more than necessary is supplied, and the energy loss of the pump is deteriorated.

It is, therefore, an object of the present invention to provide a pump apparatus to be devised to solve the above mentioned problems, and to suppress the energy loss of the pump at the straight-ahead running.

According to one aspect of the present invention, a pump apparatus arranged to supply a hydraulic fluid to a steering apparatus for a vehicle, the pump apparatus comprises: a pump housing including a pump element receiving portion; a drive shaft rotatably supported by the pump housing; a pump element received within the pump element receiving portion of the pump housing, and arranged to suck the hydraulic fluid by being rotated by the drive shaft, and to discharge the sucked hydraulic fluid; a cam ring disposed within the pump element receiving portion radially outside the pump element, and arranged to be moved so that a center of cam ring is eccentric to a center of the drive shaft, and to vary an inherent discharge amount which is a discharge flow rate per one rotation of the pump element, based on the eccentric amount of the cam ring; a steering state sensing section configured to sense or estimate a steering angle, a steering angular speed or a steering angular acceleration, and to output the steering angle, the steering angular speed or the steering angular acceleration as a steering state sensing signal; and a solenoid configured to be controlled to be driven in accordance with a variation of a current amount controlled in accordance with the steering state sensing signal and a vehicle speed, and to control the eccentric amount of the solenoid, the solenoid being configured to be controlled to suppress the eccentric amount of the cam ring so as to decrease the inherent discharge amount with respect to the steering state sensing signal when the vehicle speed is equal to or greater than a first predetermined vehicle speed, relative to the inherent discharge amount when the vehicle speed is smaller than the first predetermined vehicle speed.

According to another aspect of the invention, a pump apparatus arranged to supply a hydraulic fluid to a steering apparatus for a vehicle, the pump apparatus comprises: a pump housing including a pump element receiving portion; a drive shaft rotatably supported by the pump housing; a pump element received within the pump element receiving portion of the pump housing, and arranged to suck the hydraulic fluid by being rotated by the drive shaft, and to discharge the sucked hydraulic fluid; a cam ring disposed within the pump element receiving portion radially outside the pump element, and arranged to be moved so that a center of cam ring is eccentric to a center of the drive shaft, and to vary an inherent discharge amount which is a discharge flow rate per one rotation of the pump element, based on the eccentric amount of the cam ring; a steering state sensing section configured to sense or estimate a steering angle, a steering angular speed or a steering angular acceleration, and to output the steering angle, the steering angular speed or the steering angular acceleration as a steering state sensing signal; and a solenoid configured to be controlled to be driven in accordance with a variation of a current amount controlled in accordance with the steering state sensing signal and a vehicle speed, and to control the eccentric amount of the solenoid, the solenoid being configured to control to suppress the eccentric amount of the cam ring so as to decrease the inherent discharge amount with respect to the steering state sensing signal when a steering frequency per unit of time is smaller than a predetermined value, relative to the inherent discharge amount when the steering frequency is greater than the predetermined value.

According to still another aspect of the invention, a pump apparatus arranged to supply a hydraulic fluid to a steering apparatus for a vehicle, the pump apparatus comprises: a pump housing including a pump element receiving portion; a drive shaft rotatably supported by the pump housing; a pump element received within the pump element receiving portion of the pump housing, and arranged to suck the hydraulic fluid by being rotated by the drive shaft, and to discharge the sucked hydraulic fluid; a steering state sensing section configured to sense or estimate a steering angle, a steering angular speed or a steering angular acceleration, and to output the steering angle, the steering angular speed or the steering angular acceleration as a steering state sensing signal; and a solenoid configured to be controlled to drive in accordance with a variation of a current amount controlled in accordance with the steering state sensing signal and a vehicle speed, and to control a supply amount of the hydraulic fluid to the steering apparatus of the vehicle, the solenoid being configured to control to decrease the supply amount of the hydraulic fluid with respect to the steering state sensing signal when the vehicle speed is equal to or greater than a first predetermined vehicle speed, relative to the supply amount of the hydraulic fluid when the vehicle speed is smaller than the first predetermined vehicle speed.

DETAILED DESCRIPTION OF THE INVENTION

Hereinafter, apparatuses according to embodiments of the present invention are described in detail with reference to the drawings. A pump apparatus according to a first embodiment is applied to a hydraulic (fluid-pressure operated) power steering apparatus which is a steering apparatus of a vehicle, like a conventional apparatus.

Figure 1:
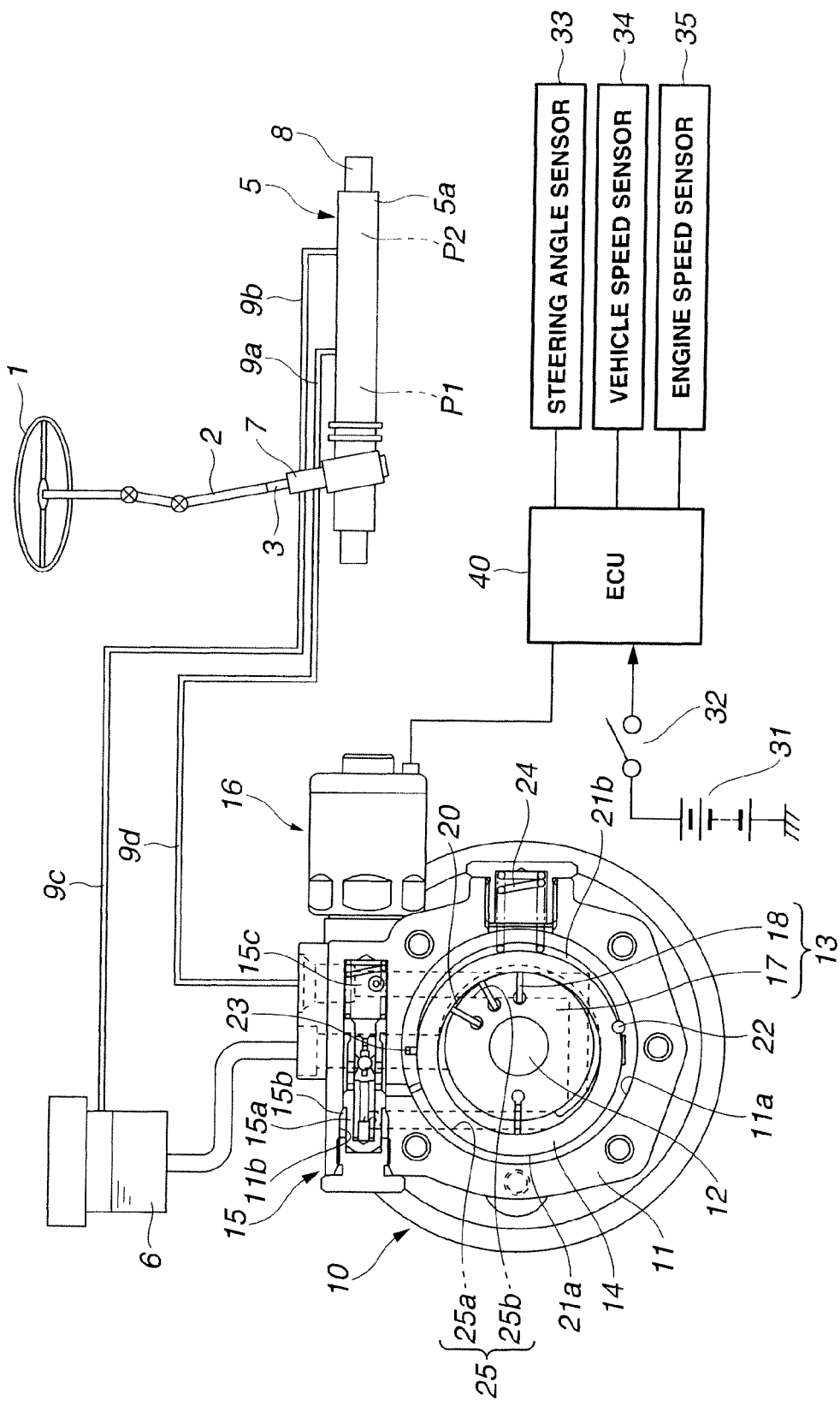
FIG. 1 is a system construction view showing a pump apparatus according to embodiments of the present invention.

FIGS. 1-10 show a pump apparatus according to the first embodiment of the present invention. First, a power steering apparatus to which the pump apparatus is applied is illustrated below. As shown in FIG. 1, the power steering apparatus includes an input shaft 2 which has a first end connected with a steering wheel 1 to integrally rotate with steering wheel 1, and a second end, and which is arranged to perform a steering input from a driver (receive a steering input from a driver); an output shaft 3 which has a first end connected with steered wheels (not shown) through a rack and pinion mechanism 4, and a second end connected with the second end of input shaft 2 through a torsion bar (not shown) to rotate relative to input shaft 2, and which is arranged to output a steering output by a reaction force of torsion variation based on the steering input from input shaft 2; a power cylinder 5 which is disposed between output shaft 3 and the steered wheels, which has pressure chambers P1 and P2 separated within power cylinder 5, and which is arranged to assist the steering output from output shaft 3 based on a hydraulic pressure acted to a pair of pressure chambers P1 and P2; a reservoir tank 6 storing a hydraulic fluid for supplying to power cylinder 5; a pump 10 arranged to suck the hydraulic fluid stored within reservoir tank 6, to pressurize the hydraulic fluid, and to supply the hydraulic fluid to the pair of pressure chambers P1 and P2; and a control valve 7 arranged to open and close by the relative rotation of the input shaft 2 and output shaft 3 by the torsion variation of the torsion bar, and to control the amount of the hydraulic fluid supplied to power cylinder 5, in accordance with an amount of the relative rotation of the input and output shafts 2 and 3 (the amount of the torsion variation of the torsion bar).

Rack and pinion mechanism 4 includes a pinion tooth (not shown) formed on an outer circumference of the first end portion of output shaft 3, and a rack tooth (not shown) formed on a rack shaft 8 disposed substantially perpendicular to the first end portion of output shaft 3, by a predetermined length, in the axial direction of rack shaft 8. In rack and pinion mechanism 4, the pinion tooth of output shaft 3 is engaged with the rack tooth of rack shaft 8. Rack shaft 8 is arranged to move in leftward and rightward directions of FIG. 1 in accordance with the rotational direction of output shaft 3. By the rotation of rack shaft 8 in the leftward and rightward directions, knuckles (not shown) connected with both ends of rack shaft 8 are pulled or pushed to vary the directions of the steered wheels.

Power cylinder 5 includes a cylinder tube 5a which is formed into a substantially cylindrical shape, and which receives rack shaft 8 serving as the piston rod to protrude in the axial direction. Power cylinder 5 includes first pressure chamber P1 and second pressure chamber P2 which are the pair of the pressure chambers, and which are separated within cylinder tube 5a by a piston (not shown) fixed on an outer circumference of rack shaft 8. A driving force (thrust) to rack shaft 8 is generated in accordance with the hydraulic pressures acted to first and second pressure chambers P1 and P2 so as to assist the steering output. In particular, first and second pressure chambers P1 and P2 are connected through first to fourth pipes 9a-9d and control valve 7 to reservoir tank 6 and pump 10. The hydraulic fluid discharged from pump 10 through control valve 7 is selectively supplied to the one of first and second hydraulic pressure chambers P1 and P2. The hydraulic fluid of the other of first and second pressure chambers P1 and P2 is returned to reservoir tank 6.

Pump 10 is a variable displacement pump. Pump 10 includes a pump housing 11 having a pump element receiving portion 11a which is formed within pump housing 11, and which is a substantially cylindrical shape; a driving shaft 12 rotatably supported in pump housing 11, and arranged to be driven and rotated by a driving force from an engine (not shown); a pump element (section or unit) 13 disposed within pump element receiving portion 11a, and arranged to be driven and rotated in a counterclockwise direction of FIG. 1 by driving shaft 12, and thereby to perform a pump function to suck the hydraulic fluid and to discharge the sucked hydraulic fluid; a substantially annular cam ring 14 which is disposed within pump element receiving portion 11a radially outside pump element 13, which is movable so that a center of cam ring 14 is deviated from (eccentric to) a center of driving shaft 12, and which is arranged to vary an inherent discharge amount which is a discharge flow amount per one rotation of pump element 13 based on this eccentric amount; a control valve 15 which is disposed within pump housing 11, which has a valve element 15a slidably disposed within control valve 15, and which is arranged to control the eccentric amount of cam ring 14 by varying a pressure difference between first and second fluid pressure chambers 21a and 21b (described later) based on an axial position of valve element 15a; and a solenoid valve 16 which is fixed to pump housing 11, and which is arranged to control the inherent discharge amount by varying a pressure difference between first and second pressure chambers 15b and 15c based on a control current outputted from an electric controller 40 described later.

Pump element 13 includes a rotor 17 rotatably disposed radially inside cam ring 14, and vanes 18 each of which has a substantially rectangular shape, each of which is received in one of radiate slots formed in the radial direction in an outer circumference portion of rotor 17, each of which is arranged to be moved into and out of the one of slots, each of which protrudes radially outwards at the rotation of rotor 17, and which are slidably abutted on the inner circumference surface of cam ring 14 to define (separate) a plurality of pump chambers 20 in a space between cam ring 14 and rotor 17.

Cam ring 14 is supported by a swing point pin 22 through a supporting groove which has a substantially semi-circular section, and which is formed on the outer circumference portion of cam ring 14. Cam ring 14 is arranged to be swung about swing point pin 22 in the leftward and rightward directions of FIG. 1. Volumes of pump chambers 20 is increased or decreased by the swing movement of cam ring 14 in the leftward and rightward directions so as to vary the inherent discharge amount. A seal member 23 is disposed on the outer circumference of cam ring 14 substantially at a position to confront the swing point pin 22 in the radial direction. Seal member 23 and swing point pin 22 separates (defines) first fluid pressure chamber 21a and second fluid pressure chamber 21b which are located, respectively, radially outside cam ring 14 on left and right sides of FIG. 1, and which operate for swing control of cam ring 14. This cam ring 14 is constantly urged, by a coil spring 24 disposed within second fluid pressure chamber 21b, toward the first fluid pressure chamber 21a's side, that is, a side on which the eccentric amount of cam ring 14 is maximized.

Control valve 15 includes valve element 15a slidably received in a valve hole 11b formed within pump housing 11, and first pressure chamber 15b (on the left side of FIG. 1) and second pressure chamber 15c (on the right side of FIG. 1) which are separated within valve hole 11b by valve element 15a. The hydraulic pressure on the upstream side of solenoid valve 16 is acted to first pressure chamber 15b. The hydraulic pressure on the downstream side of solenoid valve 16 is acted to second pressure chamber 15c. That is, a discharge passage 25 connected to pump chambers 20 on the discharge side includes a first discharge passage 25a and a second discharge passage 25b which are formed by branching from each other. First discharge passage 25a is connected with first pressure chamber 15b so that the discharge pressure is acted to first pressure chamber 15b. On the other hand, second discharge passage 25b is opened to the outside on the downstream side of solenoid valve 16 disposed in second discharge passage 25b. Moreover, second discharge passage 25b is connected to second pressure chamber 15c. With this, the hydraulic pressure depressurized in solenoid valve 16 is acted to second pressure chamber 15c and the outside. By the above-described structure, when the valve element 15a is positioned on the left side of FIG. 1, the low pressure which is the suction pressure is introduced to first fluid pressure chamber 21a, so that cam ring 14 is maintained to a maximum eccentric state by being pressed by the spring force of coil spring 24. On the other hand, when valve element 15a is positioned on the right side of FIG. 1, the high pressure which is the discharge pressure is introduced into first hydraulic fluid chamber 21a, so that cam ring 14 is moved against the spring force of coil spring 24 in a direction to decrease the eccentric amount.

Solenoid valve 16 is connected to electric controller 40 which is ECU mounted on the vehicle. Solenoid valve 16 is configured to control to vary the pressure difference on the upstream side and the downstream side of solenoid valve 16, that is, the pressure difference of the first and second pressure chambers 15b and 15c of control valve 15, based on information (signals) such as a steering angle, a vehicle speed, an engine speed, and a steering angular speed calculated based on the steering angle, and thereby to control an axial position of valve element 15a of control valve 15. With this, solenoid valve 16 is configured to control the eccentric amount of cam ring 14 to control the inherent discharge amount.

Electric controller 40 receives the electric power from a battery 31 mounted on the vehicle, through an ignition switch 32. Electric controller 40 is connected with a steering angle sensor 33 arranged to sense the steering angle by the driver, a vehicle speed sensor 34 arranged to sense the vehicle speed, and an engine speed sensor 35 arranged to sense the engine speed. Electric controller 40 receives information (signals) from steering angle sensor 33, vehicle speed sensor 34 and engine speed sensor 35.

Figure 2:
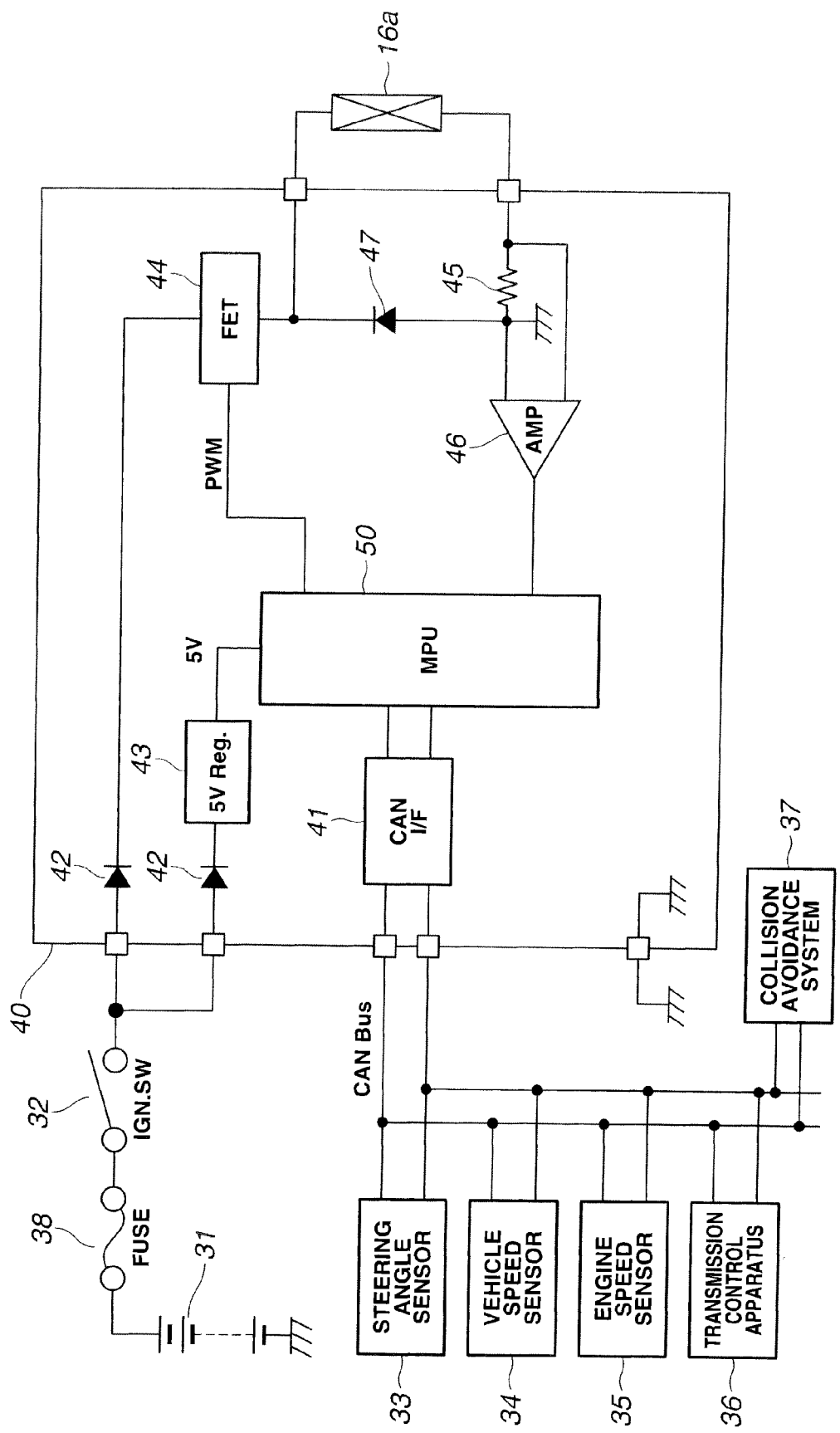
FIG. 2 is a block diagram showing an electric controller shown in FIG. 1.

As shown in FIG. 2, electric controller 40 includes an MPU (Micro Processor Unit) 50 configured to control solenoid valve 16. MPU 50 receives, through a CAN interface 41, the steering angle signal from steering angle sensor 33 provided to input shaft 2 of the power steering apparatus, the vehicle speed signal from vehicle speed sensor provided to a brake control apparatus provided to the wheels (not shown), the engine speed signal from engine speed sensor 35 provided to an engine control apparatus (not shown), a shift position signal from a transmission control apparatus 36, and an activation signal from a collision avoidance system (collision prevention system) 37. MPU 50 is configured to output a PWM driving control signal for driving solenoid valve 16 based on the outputs of these sensors and so on. The electric power is supplied to MPU 50 from battery 31 through a fuse 38, ignition switch 32, a diode 42 and a regulator 43. Regulator 43 is configured to decrease the battery voltage of about 12V to the activation voltage of 5V for MPU 50.

The PWM driving control signal from MPU 50 is outputted to FET (Field Effect Transistor) 44 serving as a switching section (means). This FET 44 is configured to switch the current supplied from battery 31 through fuse 38, ignition switch 32, and diode 42, based on the PWM driving signal, and to supply an exciting current to a coil 16a of solenoid valve 16.

Coil 16a of solenoid valve 16 includes a first end connected to FET 44, and a second end connected to a ground through a resistor (resistance) for sensing the current. The voltage generated at both ends of the resistor 45 in accordance with the current flowing through coil 16a is outputted as an actual supply current signal through an amplifier (AMP) 46 to MPU 50. Coil 16a is connected to a free wheel diode 47 disposed in parallel with coil 16a.

Figure 3:
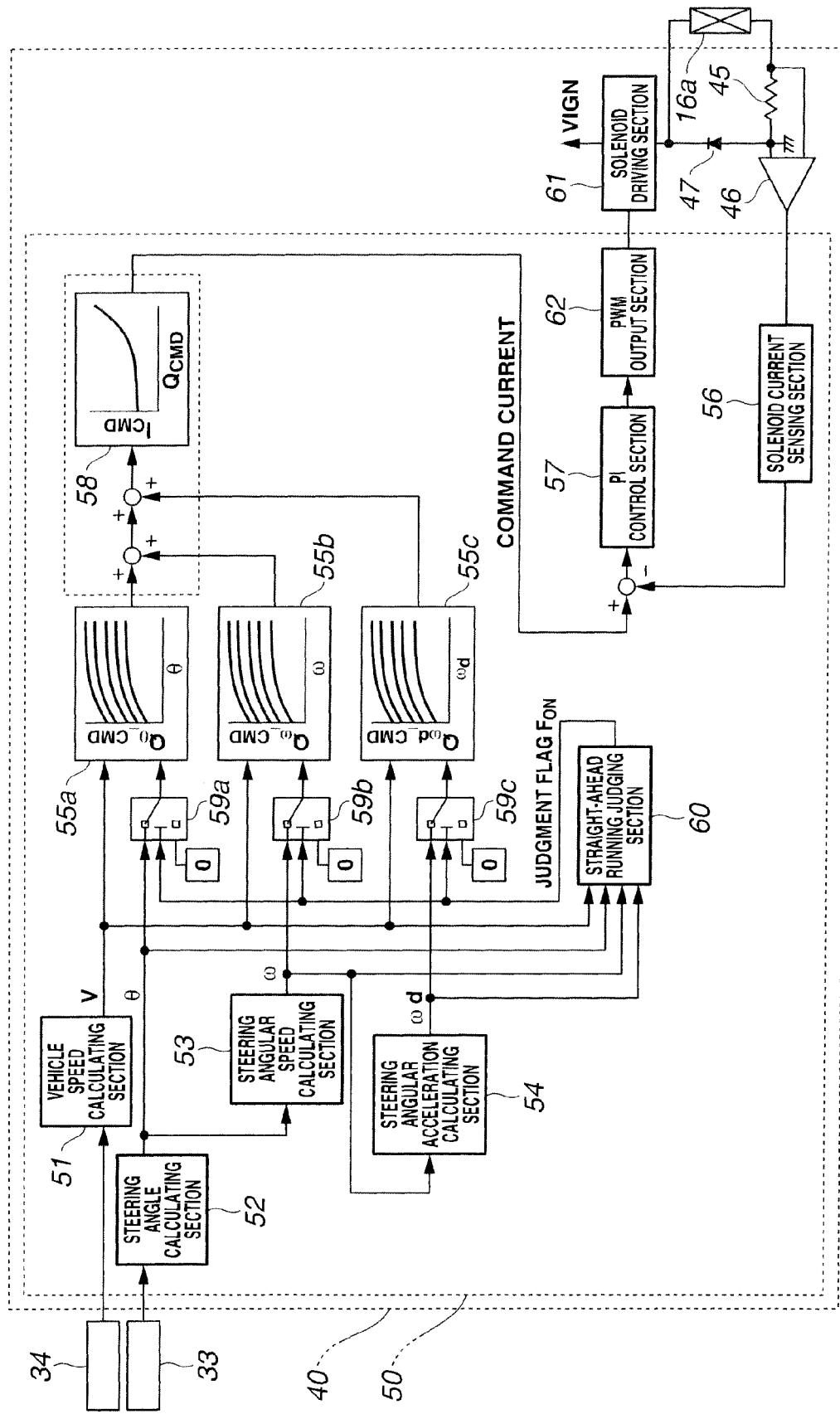
FIG. 3 is a control block diagram showing the electric controller shown in FIG. 1.

Moreover, as shown in FIG. 3, MPU 50 includes a vehicle speed calculating section 51 configured to calculate vehicle speed V based on the vehicle speed signal sensed by vehicle speed sensor 34; a steering angle calculating section 52 configured to calculate a steering angle θ based on the steering angle signal sensed by steering angle sensor 33; a target discharge flow rate calculating section 55a configured to calculate a target discharge flow rate $Q_{\theta\_CMD}$ based on steering angle θ calculated by steering angle calculating section 52 and vehicle speed V calculated by vehicle speed calculating section 51; a steering angular speed calculating section 53 configured to calculate steering angular speed ω based on steering angle θ calculated by steering angle calculating section 52; a target discharge flow rate calculating section 55b configured to calculate a target discharge flow rate $Q_{\omega\_CMD}$ based on steering angular speed ω calculated by steering angular speed calculating section 53 and vehicle speed V calculated by vehicle speed calculating section 51; a steering angular acceleration calculating section 54 configured to calculate a steering angular acceleration $\omega_d$ based on steering angular speed ω calculated by steering angular speed calculating section 53; a target discharge flow rate calculating section 55c configured to calculate a target discharge flow rate $Q_{\omega d\_CMD}$ based on steering angular acceleration $\omega_d$ calculated by steering angular acceleration calculating section 54 and vehicle speed V calculated by vehicle speed calculating section 51; a target current calculating section 58 configured to calculate a target supply current which is a command current for supplying to solenoid valve 16, based on target discharge flow rates $Q_{\theta\_CMD}$, $Q_{\omega\_CMD}$ and $Q_{\omega d\_CMD}$ calculated by target discharge flow rate calculating sections 55a-55c; a PWM control section 57 configured to calculate a PWM duty by the PI control based on a difference between the target current calculated by target current calculating section 58 and an actual supply current which flows through coil 16a, and which is sensed by a solenoid current supply sensing section 56; and a PWM signal output section 62 configured to output the PWM driving control signal to FET 44 based on the PWM duty calculated by PWM control section 57.

Moreover, MPU 50 includes a straight-ahead running judging section 60 configured to judge whether or not the vehicle is in a straight-ahead running state based on steering angle θ, steering angular speed ω and steering angular acceleration $\omega_d$ calculated by calculating sections 52-54. Straight-ahead running judging section 60 is connected to target discharge flow rate calculating sections 55a-55c through predetermined signal switching sections 59a-59c. When the straight-ahead running judging section 60 judges that the vehicle is not in the straight-ahead running state, straight-ahead running judging section 60 sets judgment flag $F_{ON}$ to zero, and outputs steering angle θ, steering angular speed ω and steering angular acceleration $\omega_d$ calculated by calculating sections 52-54, through signal switching sections 59a-59c, directly to target discharge flow rate calculating sections 55a-55c. On the other hand, when straight-ahead running judging section 60 judges that the vehicle is in the straight-ahead running state, straight-ahead running judging section 60 sets judgment flag $F_{ON}$ to 1, switches, to zero, steering angle θ, steering angular speed ω and steering angular acceleration $\omega_d$ calculated by calculating sections 52-54, through signal switching sections 59a-59c, and outputs to the target discharge flow rate calculating sections 55a-55c.

Figure 6:
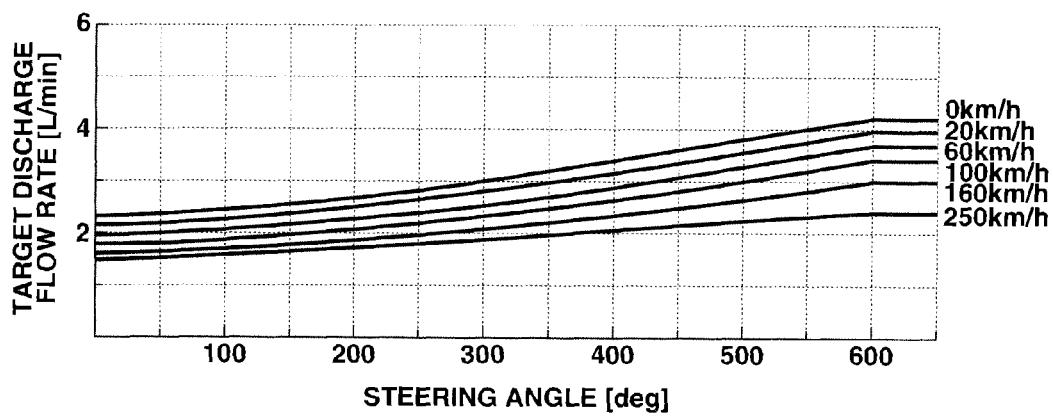
FIG. 6 is a graph showing a relationship between a steering angle and a pump discharge flow rate at each vehicle speed.

Target discharge flow rate calculating section 55a which is dependent on steering angle θ is configured to calculate target discharge flow rate $Q_{\theta\_CMD}$ from a steering angle-target discharge flow rate map shown in FIG. 6, based on vehicle speed V and steering angle θ. As shown in FIG. 6, when vehicle speed V is constant, the target discharge flow rate increases as steering angle θ increases. Moreover, the target discharge flow rate decreases as vehicle speed V increases.

Figure 7:
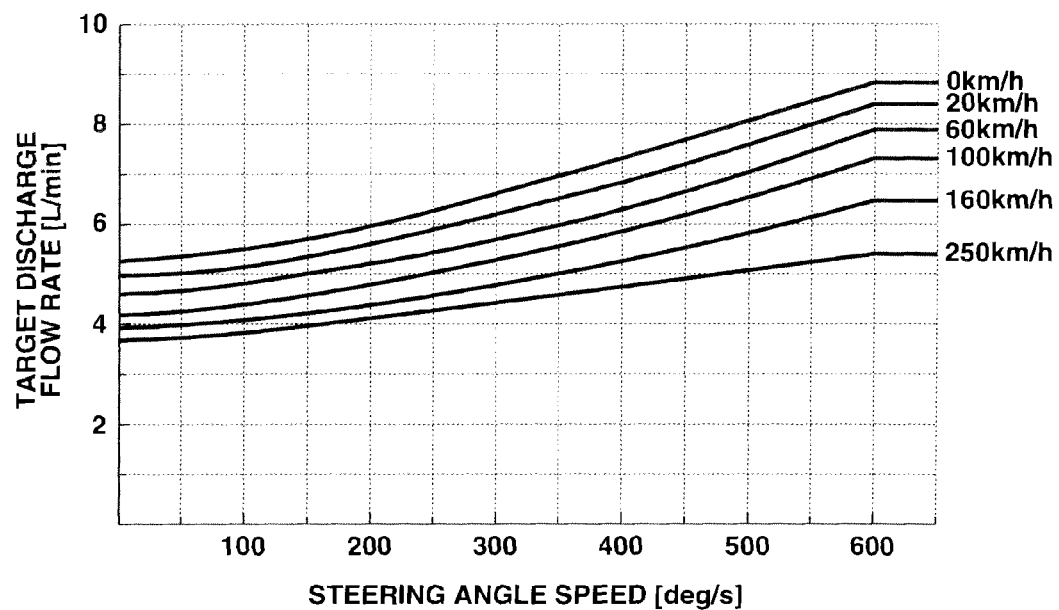
FIG. 7 is a graph showing a relationship between a steering angular speed and the pump discharge flow rate at each vehicle speed.

Target discharge flow rate calculating section 55b which is dependent on steering angular speed ω is configured to calculate target discharge flow rate $Q_{\omega\_CMD}$ from a steering angular speed-target discharge flow rate map in FIG. 7, based on vehicle speed V and steering angular speed ω. As shown in FIG. 7, when vehicle speed V is constant, the target discharge flow rate increases as steering angular speed ω increases. Moreover, the target discharge flow rate decreases as vehicle speed V increases.

Target discharge flow rate calculating section 55c which is dependent on steering angular acceleration $\omega_d$ is configured to calculate target discharge flow rate $Q_{\omega d\_CMD}$ from a predetermined steering angular acceleration-target discharge flow rate map, based on vehicle speed V and steering angular acceleration $\omega_d$. The relationship between the steering angular acceleration and the discharge flow rate is identical to those of target discharge flow rate calculating sections 55a and 55b which are dependent on steering angle θ and steering angular speed ω.

In this way, target discharge flow rate calculating sections 55a-55c have characteristics that the driver can steer lightly in a low vehicle speed running state such as a parking in which steering angle θ and steering angular speed ω increase relatively, and that the driver can obtain a stable and steady steering feeling in a high vehicle speed running state in which steering angle θ and steering angular speed ω decreases relatively.

Figure 8:
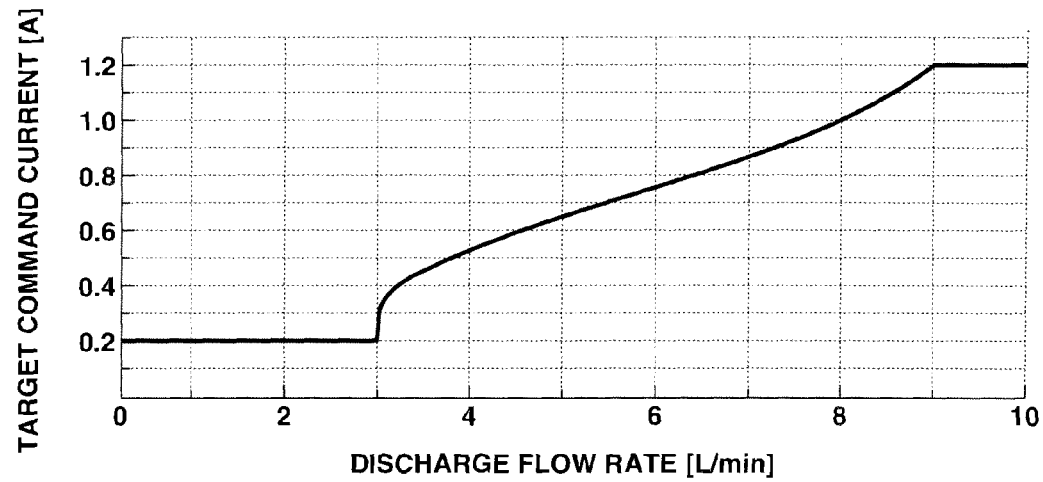
FIG. 8 is a graph showing a relationship between the pump discharge flow rate and an excitation current supplied to a solenoid valve.
Figure 9:
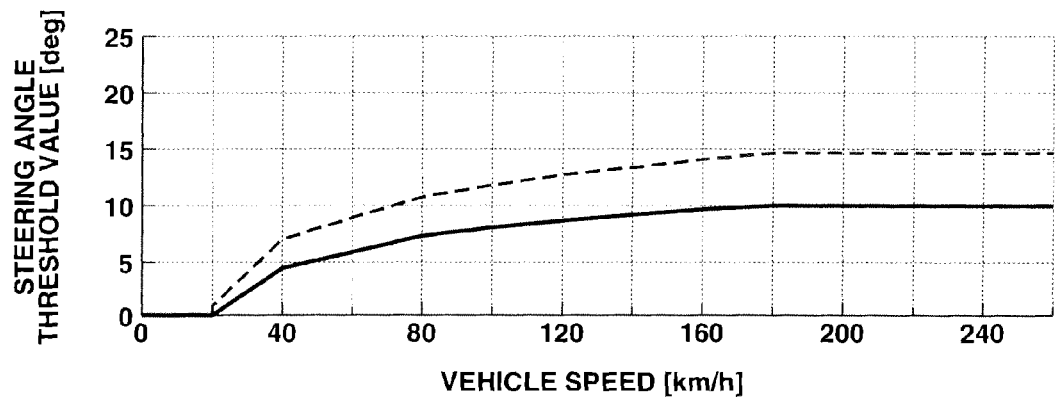
FIG. 9 is a graph showing a relationship between the vehicle speed and a judgment threshold value and a release threshold value of the steering angle.
Figure 10:
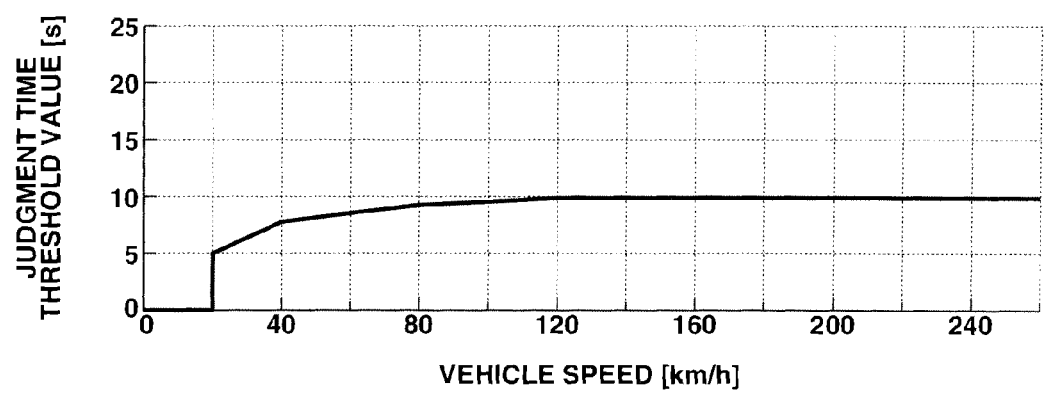
FIG. 10 is a graph showing a relationship between the vehicle speed and the judgment time.

Target current calculating section 58 is configured to add target discharge flow rate $Q_{\theta\_CMD}$ calculated by target discharge flow rate calculating section 55a which is dependent on steering angle θ, target discharge flow rate $Q_{\omega\_CMD}$ calculated by target discharge flow rate calculating section 55b which is dependent on steering angular speed ω, and target discharge flow rate $Q_{\omega d\_CMD}$ calculated by target discharge flow rate calculating section 55c which is dependent on steering angular acceleration $\omega_d$, and to calculate a target current supplied to solenoid valve 16, based on a discharge flow rate-target current map shown in FIG. 8.

FET 44 is configured to drive solenoid valve 16 through a solenoid driving section 61 based on the PWM duty calculated by PWM control section 57. Solenoid driving section 61 has, for example, a function to break (interrupt) the output when the temperature of solenoid driving section 61 becomes equal to or greater than a predetermined temperature, and a function to limit the current amount when overcurrent (current surge) flows.

Figure 4:
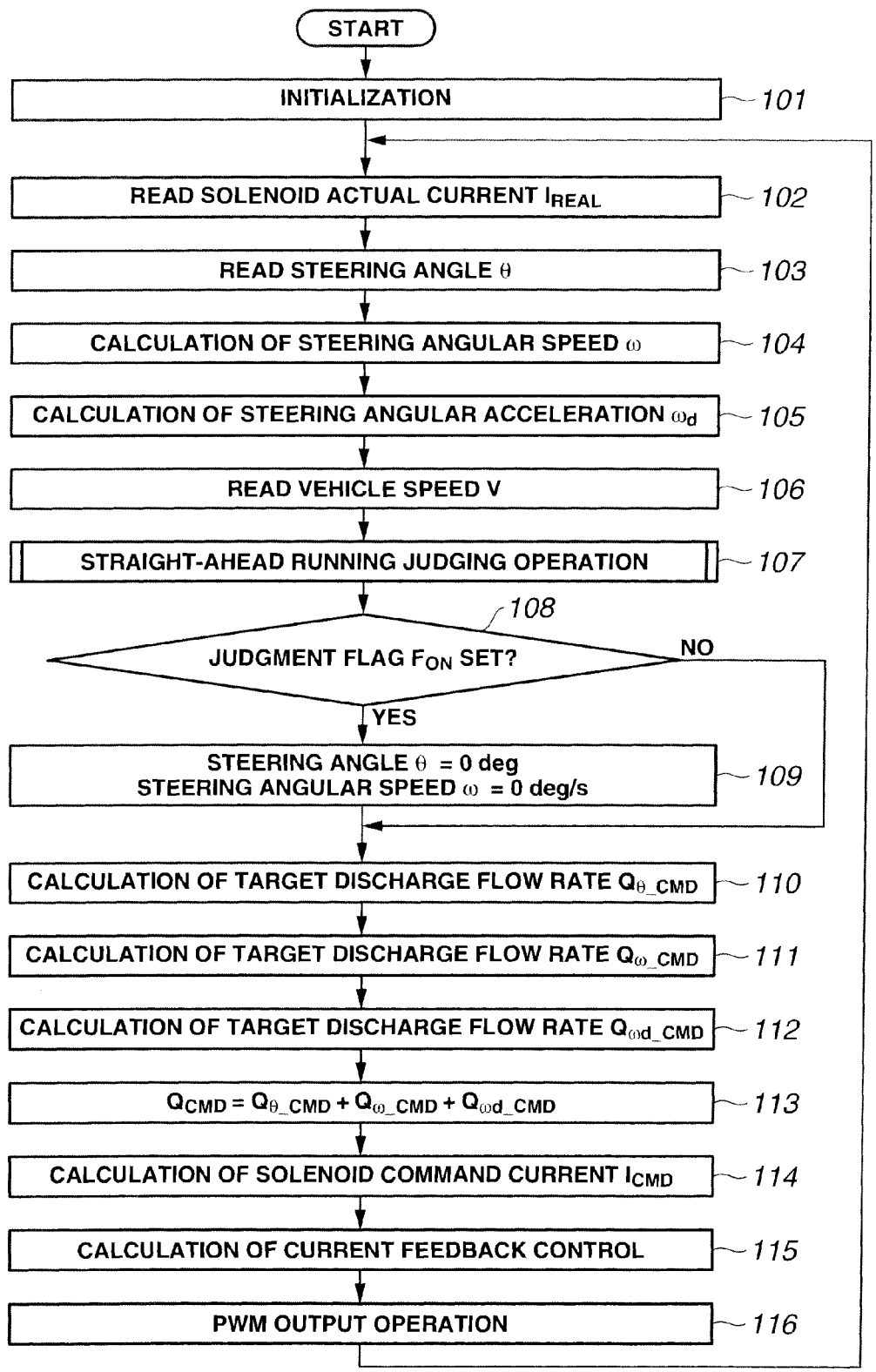
FIG. 4 is a flowchart showing a control operation of a pump apparatus according to a first embodiment of the present invention.
Figure 5:
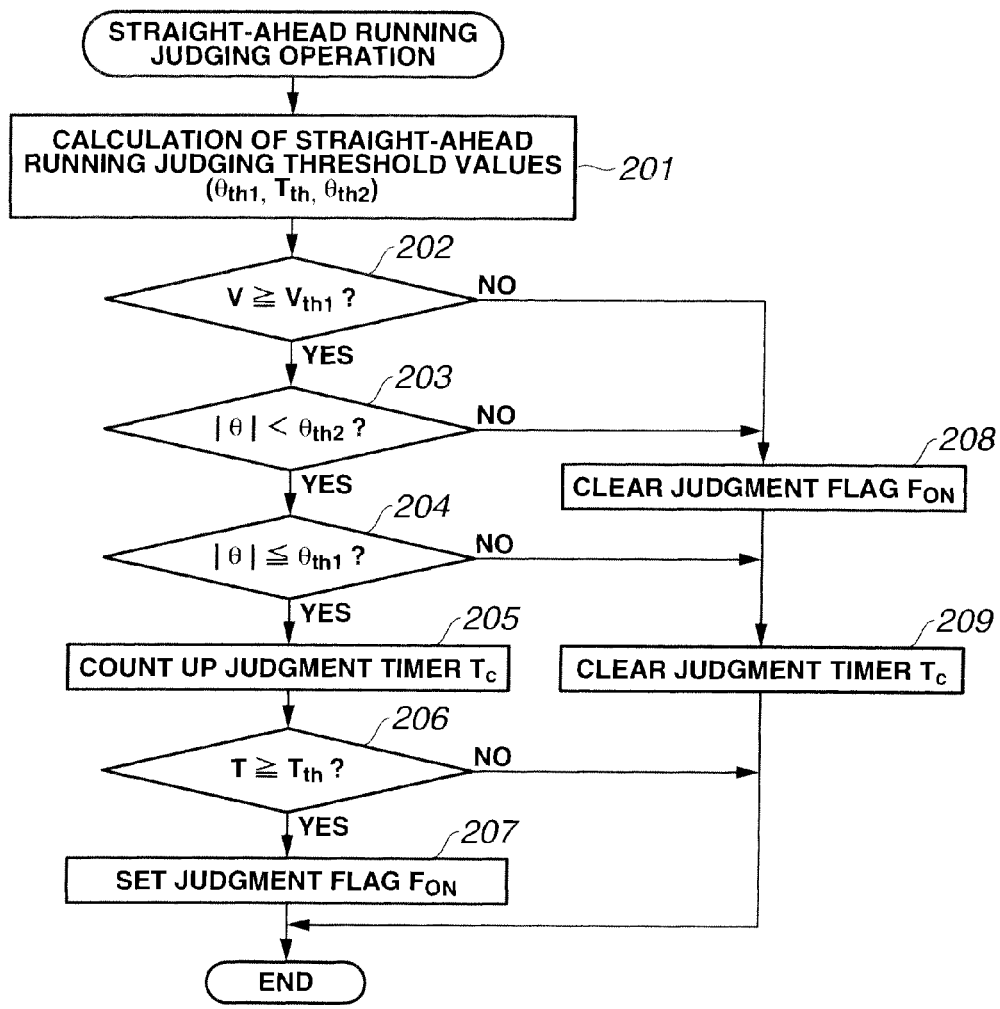
FIG. 5 is a flowchart showing a straight-ahead running judgment operation of the control operation of the pump apparatus shown in FIG. 1.

Hereinafter, a control operation of solenoid valve 16 by MPU 50 based on the straight-ahead running judgment is illustrated with reference to FIGS. 4 and 5. FIG. 4 is a flowchart showing a control operation of solenoid valve 16 by MPU 50 based on the straight-ahead running judgment. FIG. 5 is a flowchart showing a straight-ahead running judging operation by straight-ahead running judging section 60.

As shown in FIG. 4, MPU 50 performs initialization at step S101. Subsequently to step S101, MPU 50 reads actual supply current $I_{real}$ flowing through coil 16a at step S102. Subsequently to step S102, MPU 50 reads steering angle θ at step S103. Subsequently to step S103, MPU 50 calculates steering angular speed ω based on steering angle θ at step S104. Subsequently to step S104, MPU 50 calculates steering angular acceleration $\omega_d$ based on steering angular speed ω at step S105. Subsequently to step S105, MPU 50 reads vehicle speed V at step S106.

Subsequently to step S106, MPU 50 performs a below-described straight-ahead running judging operation shown in FIG. 5 at step S107. Subsequently to step S107, MPU 50 judges whether or not judgment flag $F_{ON}$ is set to 1 at step S108. When the answer of step S108 is affirmative (YES), the process proceeds to step S109. At step S109, MPU 50 sets steering angle θ and steering angular speed ω to zero. Subsequently to step S109, at step S110, MPU 50 calculates target discharge flow rate $Q_{\theta\_CMD}$ which is dependent on steering angle θ from the steering angle-target discharge flow rate map (cf. FIG. 6). Subsequently to step S110, MPU 50 calculates target discharge flow rate $Q_{\omega\_CMD}$ which is dependent on steering angular speed ω from the steering angular speed-target discharge flow rate map (cf. FIG. 7) at step S111. Subsequently to step S111, MPU 50 calculates target discharge flow rate $Q_{\omega d\_CMD}$ which is dependent on steering angular acceleration $\omega_d$ at step S112. Subsequently to step S112, MPU 50 calculates target discharge flow rate $Q_{CMD}$ by adding these calculated values $Q_{\theta\_CMD}$, $Q_{\omega\_CMD}$ and $Q_{\omega d\_CMD}$ at step S113. Subsequently to step S113, MPU 50 calculates command current $I_{CMD}$ supplied to solenoid valve 16 from the discharge flow rate-target current map (cf. FIG. 8) based on target discharge flow rate $Q_{CMD}$ at step S114. Subsequently to step S114, MPU 50 calculates the PWM duty by using the PI control from a difference between the calculated command current $I_{CMD}$ and actual supply current $I_{real}$ flowing through coil 16a at step S115. Subsequently to step S115, MPU 50 outputs the PWM driving control signal to solenoid valve 16 based on the PWM duty at step S116. In this way, when the straight-ahead running state is judged, MPU 50 substitutes zero to steering angle θ and steering angular speed ω. With this, the eccentricity of cam ring 14 is suppressed by suppressing target discharge flow rate $Q_{CMD}$ to minimum while the straight-ahead running state is judged (determined).

On the other hand, when the answer of step S108 is negative (NO) (MPU 50 judges that the judgment flag $F_{ON}$ is not set to 1 (cleared)), the process proceeds to steps S110-S116. MPU 50 performs the control operations at steps S110-S116, based on steering angle θ read at step S103, and steering angular speed ω and steering angular acceleration $\omega_d$ calculated at steps S104 and S105. That is, when the straight-ahead running state is not judged (determined), MPU 50 calculates target discharge flow rate $Q_{CMD}$ based on the actual sensed values (calculated values) of steering angle θ and steering angular speed ω. With this, the eccentric amount of cam ring 14 is controlled in accordance with vehicle speed V, steering angle θ, steering angular speed ω and so on while the straight-ahead running state is not judged, like the conventional control operation.

Next, the straight-ahead running judging operation in straight-ahead running judging section 60 is illustrated. As shown in FIG. 5, at step S201, straight-ahead running judging section 60 calculates threshold values $\theta_{th1}$, $T_{th}$ and $\theta_{th2}$ for using the straight-ahead running judgment, based on vehicle speed V read at step S106. Threshold values $\theta_{th1}$ and $\theta_{th2}$ are determined in accordance with vehicle speed V as shown in a steering angle threshold value map of FIG. 9. Threshold value $\theta_{th1}$ is represented by a solid line of FIG. 9. Threshold value $\theta_{th1}$ is a threshold value of the steering angle which is a reference value to judge the straight-ahead running at step S204 described later, and which corresponds to a predetermined steering angle. Threshold value $\theta_{th2}$ is represented by a broken line of FIG. 9. Threshold value $\theta_{th2}$ is a threshold value of the steering angle which is a reference value to cancel (release) the straight-ahead running judgment at step S203 described later, and which corresponds to a predetermined cancel threshold value. As shown in a judgment time map of FIG. 10, threshold value $T_{th}$ is determined in accordance with vehicle speed V, like threshold values $\theta_{th1}$ and $\theta_{th2}$. Threshold value $T_{th}$ is a threshold value of the judgment time period which is a reference value for the straight-ahead running judgment at step S206 described later, and which corresponds to a predetermined time period.

Subsequently to step S201 (after the calculation of these threshold values $\theta_{th1}$, $T_{th}$ and $\theta_{th2}$), straight-ahead running judging section 60 judges whether or not vehicle speed V is equal to or greater than a first predetermined vehicle speed $V_{th1}$ (vehicle speed V≥a first predetermined vehicle speed $V_{th1}$), as a precondition for the straight-ahead running judgment at step S202. When the answer of step S202 is affirmative (YES) (vehicle speed V≥a first predetermined vehicle speed $V_{th1}$ is satisfied), the process proceeds to step S203. At step S203, straight-ahead running judging section 60 judges whether or not an absolute value |θ| of the steering angle is smaller than predetermined cancel threshold value $\theta_{th2}$ (absolute value |θ| of the steering angle<predetermined cancel threshold value $\theta_{th2}$), based on the steering angle threshold value map (cf. FIG. 9). On the other hand, when the answer of step S202 is negative (NO) or the answer of step S203 is negative (NO), the process proceeds to step S208. At step S208, straight-ahead running judging section 60 clears judgment flag $F_{ON}$ to cancel the straight-ahead running judgment.

When the answer of step S203 is affirmative (YES), the process proceeds to step S204. At step S204, straight-ahead running judging section 60 judges whether or not absolute value |θ| of the steering angle is equal to or smaller than predetermined steering angle $\theta_{th1}$ (absolute value |θ| of the steering angle≤predetermined steering angle $\theta_{th1}$) based on the steering angle threshold value map (cf. FIG. 9) for judging whether or not the vehicle is in the straight-ahead running state based on steering angle θ. When the answer of step S204 is affirmative (YES) (the vehicle is in the straight-ahead running state), the process proceeds to step S205. At step S205, straight-ahead running judging section 60 counts up judgment timer $T_c$. When the answer of step S204 is negative (NO) (the vehicle is not in the straight-ahead running state), the process proceeds to step S209. At step S209, straight-ahead running judging section 60 clears judgment timer $T_c$. In this way, in this embodiment, the straight-ahead running judgment is performed in view of (in accordance with) vehicle speed V and also steering angle θ.

Subsequently to step S205 (after the count-up of judgment timer $T_c$), at step S206, straight-ahead running judging section 60 judges whether or not an accumulation (summation) time T of judgment timer $T_c$ is equal to or greater than predetermined time $T_{th}$ (accumulation time T of judgment timer $T_c$≥predetermined time $T_{th}$) based on the judgment time map (cf. FIG. 10) for judging duration time of the straight-ahead running state. When the answer of step S206 is affirmative (YES), the process proceeds to step S207. At step S207, straight-ahead running judging section 60 sets judgment flag $F_{ON}$ to 1. The judgment of the straight-ahead running state is determined, and the process is finished. When the answer of step S206 is negative (NO), the judgment of the straight-ahead running state is not determined, and the process is finished. That is, it is deficient (not satisfied) only that vehicle speed V and steering angle θ temporarily satisfy the requirements (conditions) of the straight-ahead running judgment. When the requirements of the straight-ahead running judgment is satisfied during predetermined time period $T_{th}$ or more, the control operation to suppress the eccentricity of cam ring 14 is performed.

As described above, at least when vehicle speed V is equal to or greater than first predetermined vehicle speed $V_{th1}$, it is considered that the vehicle is in the straight-ahead running state. In this case, command current $I_{CMD}$ is determined by substituting zero to steering angle θ and steering angular speed ω, instead of by the actual sensed steering angle θ and the actual sensed steering angular speed ω. The control operation is performed by thus-determined command current $I_{CMD}$ so as to suppress the eccentricity of cam ring 14 through solenoid valve 16. With this, even when the steering operation is generated in the straight-ahead running state by the slight steering operation and the disturbance such as the kickback, the inherent discharge amount (the discharge flow rate) of pump 10 is not sensitively increased, and it is possible to decrease the energy loss of pump 10.

By the above-described control operation, the inherent discharge amount of the pump is not varied in the straight-ahead running state by the slight steering operation and so on. That is, cam ring 14 is not swung by the slight steering operation and so on. With this, the frequency of the swing movement of cam ring 14 is decreased, and it is possible to suppress the abrasion caused by the unnecessary sliding movement of cam ring 14. Therefore, it is possible to improve the durability of the pump.

Moreover, in the control operation of this example, when steering angle θ and steering angular speed ω become equal to or greater than predetermined values, that is, when the relatively large steering amount is needed, the discharge flow rate of the pump is rapidly increased by the general eccentric control. Therefore, it is possible to ensure the responsiveness of the steering.

The control operation of this example employs an additional condition that absolute value |θ| of the steering angle is equal to or smaller than predetermined steering angle $θ_{th1}$. Steering angle θ is considered in addition to vehicle speed V. With this, it is possible to obtain the straight-ahead running judgment with higher accuracy.

Moreover, the control operation of this example employs an additional condition that the conditions of vehicle speed V and steering angle θ are satisfied during predetermined time period $T_{th}$ or more. With this, it is obtain the straight-ahead running judgment with further higher accuracy.

In the control operation of this example, it is desirable that the control operation is stopped when one of the conditions of vehicle speed V<first predetermined vehicle speed $V_{th}$, steering angle θ>predetermined steering angle $θ_{th1}$ is satisfied. That is, when the vehicle becomes, in the straight-ahead running state, the low speed state in which the steering angle θ may be increased, or when the sudden steering is performed, the control operation is immediately stopped, and switched to the general eccentric control operation. With this, it is possible to improve the steering feeling at the switching from the straight-ahead running state to the rotation (revolution or turn).

Moreover, in the control operation of solenoid valve 16, it is desirable that the inherent discharge amount of the pump based on target discharge flow rate $Q_{CMD}$ obtained by the control operation of this example is smaller than the minimum value of the inherent discharge amount of pump 10 when the control operation is not performed. That is, the inherent discharge amount of pump 10 when the control operation is performed is set smaller than the minimum inherent discharge amount when the control operation is not performed. With this, it is possible to improve the effect of the energy saving.

Figure 11:
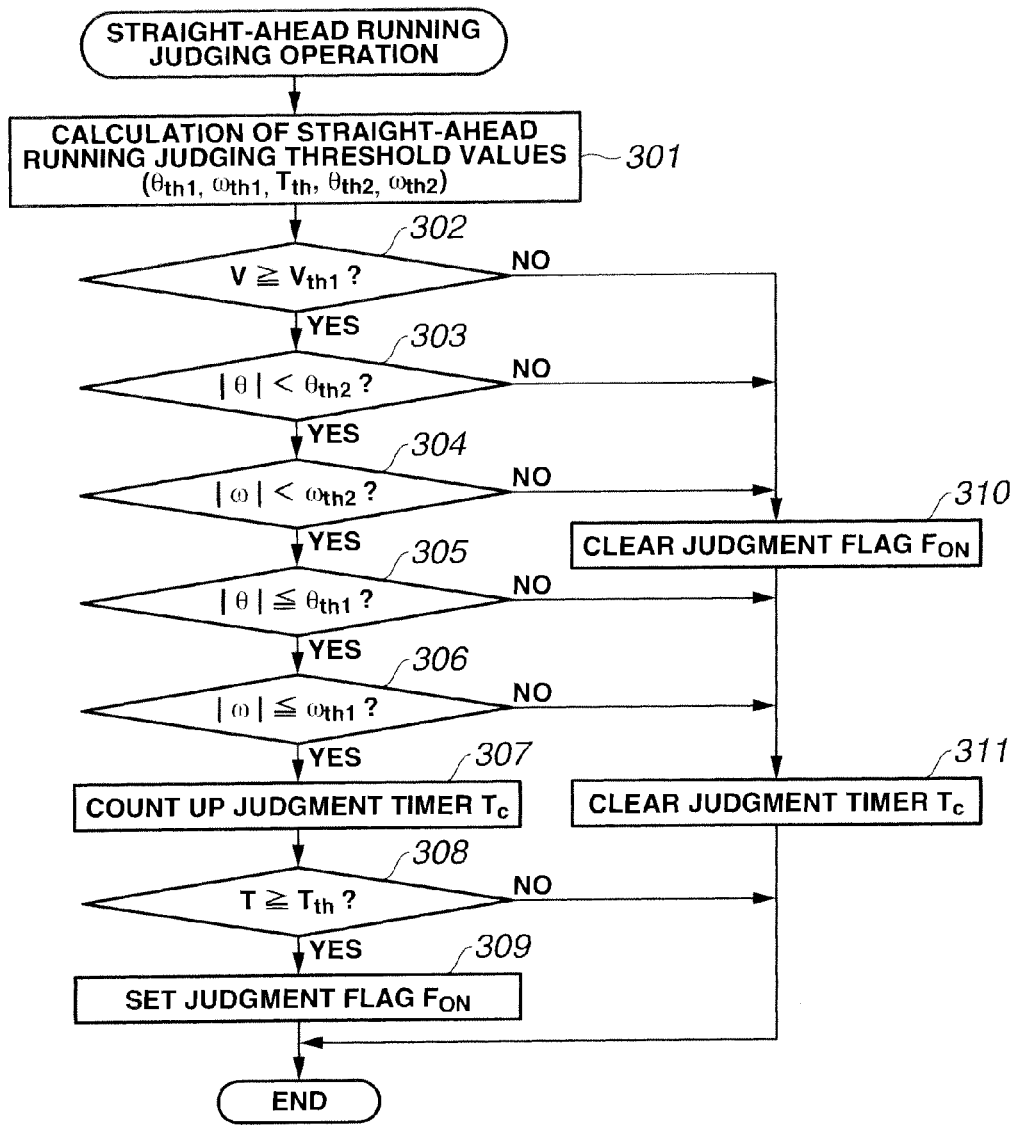
FIG. 11 is a flowchart showing a first variation of the straight-ahead running judging operation in the control operation of the pump apparatus shown in FIG. 5.
Figure 12:
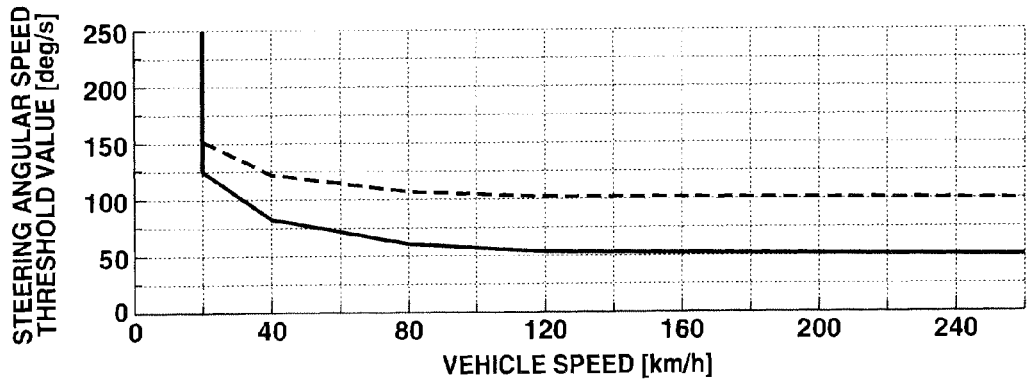
FIG. 12 is a graph showing a relationship between the vehicle speed and a judgment threshold value and a cancel threshold value of the steering angular speed.
Figure 13:
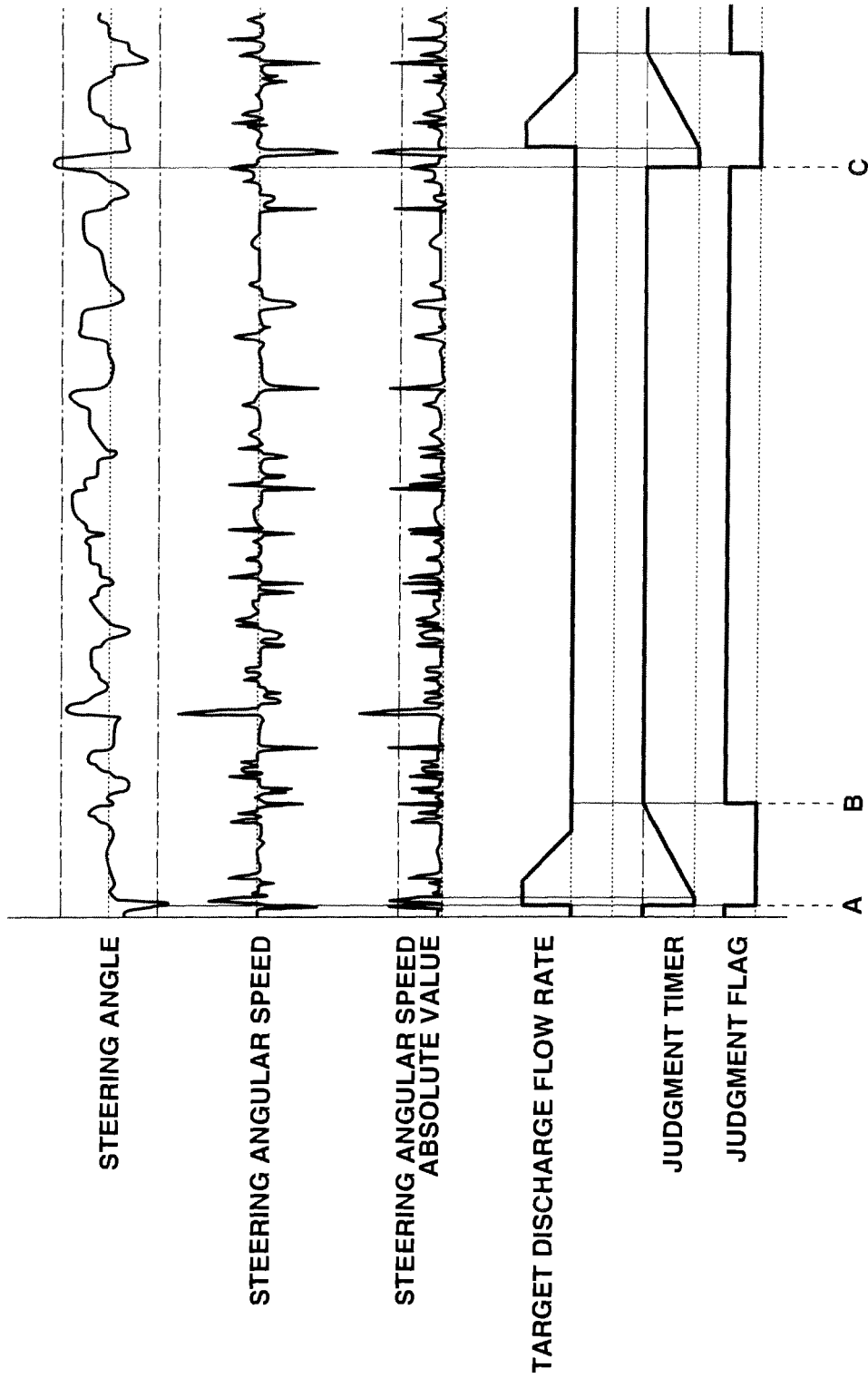
FIG. 13 is a time chart of the control operation of the pump apparatus shown in FIGS. 5 and 12.

FIGS. 11-13 show a first variation according to the first embodiment of the present invention. In this first variation, the straight-ahead running judging operation is different from that of the first embodiment. In particular, steering angular speed ω is considered in addition to the straight-ahead running judgment according to the first embodiment.

In this first variation, as shown in FIG. 11, at step S301, straight-ahead running judging section 60 calculates the threshold values $θ_{th1}$, $ω_{th1}$, $T_{th}$, $θ_{th2}$ and $ω_{th2}$ for using a straight-ahead running judgment described later, based on vehicle speed V read at step S106. These threshold values $ω_{th1}$ and threshold value $ω_{th2}$ are determined in accordance with vehicle speed V as shown in a steering angular speed threshold value map of FIG. 12. Threshold value $ω_{th1}$ is a represented by a solid line of FIG. 12. Threshold value $ω_{th1}$ is a threshold value of the steering angular speed which is a reference value to judge the straight-ahead running state at step S306 described later, and which is a predetermined steering angular speed. Threshold value $ω_{th2}$ is a represented by a broken line of FIG. 12. Threshold value $ω_{th2}$ is a predetermined cancel threshold value of the steering angular speed which is a reference value to cancel the judgment of the straight-ahead running state at step S304 described later.

Subsequently to step S301 (after calculation of threshold values $θ_{th1}$, $ω_{th1}$, $T_{th}$, $θ_{th2}$ and $ω_{th2}$), at step S302, straight-ahead running judging section 60 judges whether or not vehicle speed V is equal to or greater than first predetermined threshold value $V_{th1}$ (vehicle speed V≥first predetermined vehicle speed $V_{th1}$), as a precondition for the straight-ahead running judgment. When the answer of step S302 is affirmative (YES), the process proceeds to step S303. At step S303, straight-ahead running judging section 60 judges whether or not absolute value |θ| of the steering angle is smaller than a predetermined cancel threshold value $θ_{th2}$ (absolute value |θ| of the steering angle<predetermined cancel threshold value $θ_{th2}$), based on the steering angle threshold value map (cf. FIG. 9). When the answer of step S303 is affirmative (YES), the process proceeds to step S304. At step S304, straight-ahead running judging section 60 judges whether or not absolute value |ω| of the steering angular speed is smaller than predetermined cancel threshold value $ω_{th2}$ (absolute value |ω| of the steering angular speed<predetermined cancel threshold value $ω_{th2}$), based on the steering angular speed threshold value map (cf. FIG. 12). When the answer of step S304 is affirmative (YES), the process proceeds to step S305. At step S305, straight-ahead running judging section 60 judges whether or not absolute value |θ| of the steering angle is equal to or smaller than predetermined steering angle $θ_{th1}$ (absolute value |θ| of the steering angle≤predetermined steering angle $θ_{th1}$) based on the steering angle threshold value map (cf. FIG. 9), for the straight-ahead running state judgment based on steering angle θ. On the other hand, when one of the answers of steps S302-S304 are negative (NO), the process proceeds to step S310. At step S310, straight-ahead running judging section 60 clears judgment flag $F_{ON}$ to cancel a straight-ahead running judgment described later.

When the answer of step S305 is affirmative (YES), straight-ahead running judging section 60 judges whether or not steering angular speed |ω| is equal to or smaller than predetermined steering angular speed $ω_{th1}$ (steering angular speed |ω|≤predetermined steering angular speed $ω_{th1}$), based on the steering angular speed threshold value map (cf. FIG. 12), for the straight-ahead running judgment based on steering angular speed ω. When the answer of step S306 is affirmative (YES) (the vehicle is in the straight-ahead running state), the process proceeds to step S307. At step S307, straight-ahead running judging section 60 counts up judgment timer $T_c$. When the answer of step S305 or S306 is negative (NO) (the vehicle is not in the straight-ahead running state), the process proceeds to step S311. At step S311, straight-ahead running judging section 60 clears judgment timer $T_c$. In this way, in this embodiment, the straight-ahead running judgment is performed in view of (in accordance with) vehicle speed V, steering angle θ, and also steering angular speed ω.

Subsequently to step S307 (after the count-up of judgment timer $T_c$), at step S308, straight-ahead running judging section 60 judges whether or not accumulation time T of judgment timer $T_c$ is equal to or greater than predetermined time period $T_{th}$ (accumulation time T of judgment timer $T_c$≥predetermined time period $T_{th}$), based on the judgment time map (cf. FIG. 10) for the judgment of the duration time of the straight-ahead running state. When the answer of step S308 is affirmative (YES), the process proceeds to step S309. At step S309, straight-ahead running judging section 60 sets judgment flag $F_{ON}$ to 1. The judgment of the straight-ahead running state is determined, and the process is finished. On the other hand, when the answer of step S308 is negative (NO), the straight-ahead running state is not determined, and the process is finished.

Hereinafter, the above-described control operation is illustrated with reference to a time chart of FIG. 13. At a time A at which steering angle θ exceeds predetermined cancel threshold value $θ_{th2}$ in a state in which judgment flag $F_{ON}$ is set to 1, judgment flag $F_{ON}$ is cleared at step S310 since the vehicle is not in the straight-ahead running state, and moreover judgment timer $T_c$ is cleared at step S311. Target discharge flow rate $Q_{CMD}$ is set based on actual steering angle θ and actual steering angular speed ω at steps S110-S113. Target discharge flow rate $Q_{CMD}$ largely increases. Then, when steering angle θ becomes equal to or smaller than predetermined steering angle threshold value $θ_{th1}$, judgment timer $T_c$ is counted up at step S307, and target discharge flow rate $Q_{CMD}$ gradually decreases in accordance with the decrease of the steering angle θ. Then, at a time B at which accumulation time period T by the count-up of judgment timer $T_c$ becomes equal to or greater than predetermined time $T_{th}$, judgment flag $F_{ON}$ is again set to 1 at step S309. Consequently, steering angle θ and steering angular speed ω are set to zero while judgment flag $F_{ON}$ is set to 1, and target discharge flow rate $Q_{CMD}$ is calculated based on these steering angle θ and steering angular speed ω of zero at step S109. Therefore, the control operation to suppress the eccentricity of cam ring 14 is performed. When the steering angle θ exceeds predetermined cancel threshold value $θ_{th2}$ again at a time C of FIG. 13, the control operation is performed like the control operation at time A.

In this way, the control operation of this example employs the additional condition that absolute |ω| of the steering angular speed $ω_{th1}$, in addition to the conditions of the straight-ahead running judgment according to the first embodiment. The control operation is performed based on the steering angular speed. With this, it is possible to further improve the accuracy of the straight-ahead running judgment, and to further decrease the energy loss of the pump.

In the control operation of this example, it is desirable that the control operation is stopped when one of the conditions of vehicle speed V<first predetermined vehicle speed $V_{th}$, steering angle θ>predetermined steering angle $θ_{th1}$, and steering angular speed ω>predetermined angular speed $ω_{th1}$ is satisfied. That is, when the vehicle becomes, in the straight-ahead running state, the low speed state in which the steering angle θ may be increased, or when the sudden steering is performed, the control operation is immediately stopped, and switched to the general eccentric control operation. With this, it is possible to improve the steering feeling at the switching from the straight-ahead running state to the rotation (revolution or turn).

Figure 14:
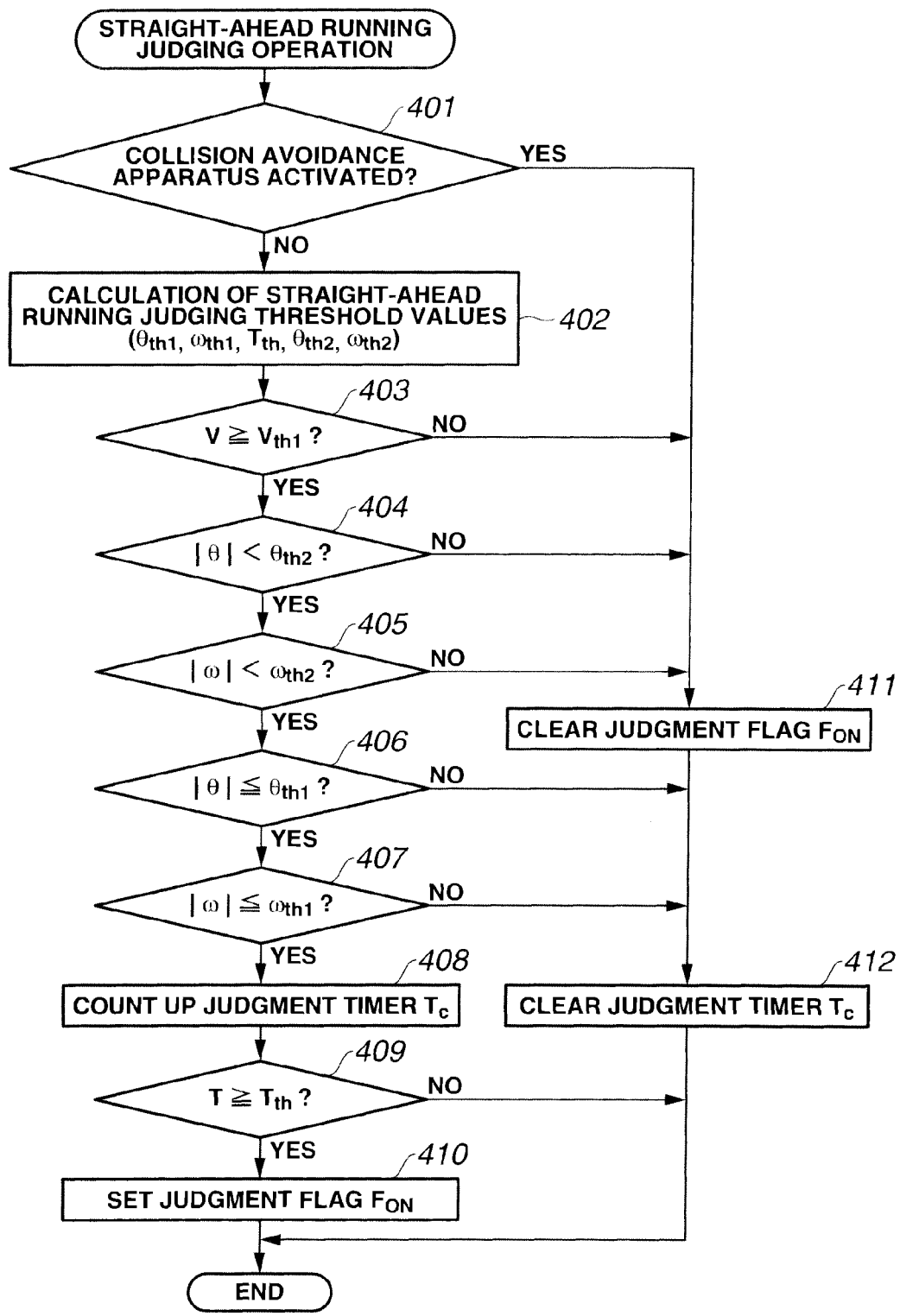
FIG. 14 is a flowchart showing a second variation of the straight-ahead running judging operation in the control operation of the pump apparatus shown in FIG. 5.

FIG. 14 shows a second variation of the first embodiment of the present invention. In this second variation, the straight-ahead running judgment operation is different from that of the first embodiment. In particular, in the second variation of the first embodiment, an operation of collision avoidance system 37 is considered in addition to the control operation of the first variation of the first embodiment.

In this second variation of the first embodiment, at step S401, straight-ahead running judging section 60 judges whether or not an inter-vehicular distance (following distance) between the own vehicle (host vehicle) and other vehicle running forward of the own vehicle, or a distance between an obstacle on the forward side and the own vehicle becomes equal to or smaller than a predetermined distance, that is, whether or not collision avoidance system 37 is activated. When the answer of step S401 is negative (NO), the process proceeds to step S402. At step S402, straight-ahead running judging section 60 calculates threshold values $θ_{th1}$, $ω_{th1}$, $T_{th}$, $θ_{th2}$ and $ω_{th2}$.

Subsequently to step S402, at step S403, straight-ahead running judging section 60 judges whether or not vehicle speed V is equal to or greater than first vehicle speed threshold value $V_{th1}$ (vehicle speed V≥first vehicle speed threshold value $V_{th1}$), as a precondition of the straight-ahead running judgment. When the answer of step S403 is affirmative (YES), the process proceeds to step S404. At step S404, straight-ahead running judging section 60 judges whether or not absolute value |θ| of the steering angle is smaller than predetermined cancel threshold value $θ_{th2}$ (absolute value |θ| of the steering angle<predetermined cancel threshold value $θ_{th2}$), based on the steering angle threshold value map (cf. FIG. 9). When the answer of step S404 is affirmative (YES), the process proceeds to step S405. At step S405, straight-ahead running judging section 60 judges whether or not the absolute value |ω| of the steering angular speed is smaller than predetermined cancel threshold value $ω_{th2}$ (the absolute value |ω| of the steering angular speed<predetermined cancel threshold value $ω_{th2}$), based on the steering angular speed map (cf. FIG. 12). On the other hand, when the answer of step S401 is affirmative (YES) (straight-ahead running judging section 60 judges that collision avoidance system 37 is activated), or when one of the answers of steps S403-S405 is negative (NO), the straight-ahead running judgment is canceled, and judgment flag $F_{ON}$ is cleared at step S411.

When the answer of step S405 is affirmative (YES), the process proceeds to step S406. At step S406, straight-ahead running judging section 60 judges whether or not absolute value |θ| of the steering angle is equal to or smaller than predetermined steering angle $θ_{th1}$ (absolute value |θ| of the steering angle≤predetermined steering angle $θ_{th1}$) based on the steering angle threshold value map (cf. FIG. 9) for the straight-ahead running state judgment based on steering angle θ. When the answer of step S406 is affirmative (YES), the process proceeds to step S407. At step S407, straight-ahead running judging section n60 judges whether or not absolute value |ω| of the steering angular speed is equal to or smaller than predetermined steering angular speed $ω_{th1}$ (absolute value |ω| of the steering angular speed≤predetermined steering angular speed $ω_{th1}$) based on the steering angular speed threshold value map (cf. FIG. 12) for the straight-ahead running judgment based on steering angular speed ω. When the answer of step S407 is affirmative (YES) (the vehicle is in the straight-ahead running state), the process proceeds to step S408. At step S408, straight-ahead running judging section 60 counts up judgment timer $T_c$. When the answer of step S406 or S407 is negative (NO) (the vehicle is not in the straight-ahead running state), the process proceeds to step S412. At step S412, straight-ahead running judging section 60 clears judgment timer $T_c$. In this way, the control operation of this example considers the activation of collision avoidance system 37 in addition to vehicle speed V, steering angle θ and steering angular speed ω, and thereby performs the straight-ahead running judgment.

Subsequently to step S408 (after the count-up of judgment timer $T_c$), at step S409, straight-ahead running judging section 60 judges whether or not accumulation time T of judgment timer $T_c$ is equal to or greater than predetermined time $T_{th}$ (accumulation time T of judgment timer $T_c$≥predetermine time $T_{th}$), based on the judgment time map (cf. FIG. 10) for judgment of the duration time of the straight-ahead running state. When the answer of step S409 is affirmative (YES), the judgment of the straight-ahead running state is determined, and the process proceeds to step S410. At step S410, straight-ahead running judging section 60 sets judgment flag $F_{ON}$ to 1. Subsequently to step S410, the process is finished. On the other hand, when the answer of step S409 is negative (NO), the straight-ahead running state is not determined, and the process is finished.

In this way, the control operation of the second variation considers the distance between the own vehicle (host vehicle) and the forward vehicle or the forward obstacle. With this, when the sudden steering is needed by the approach of the forward vehicle or the forward obstacle, it is possible to rapidly increase the discharge flow rate of pump 10 based on the normal eccentric control. Consequently, it is possible to improve the responsiveness of the steering at the avoidance of the danger and so on.

Figure 15:
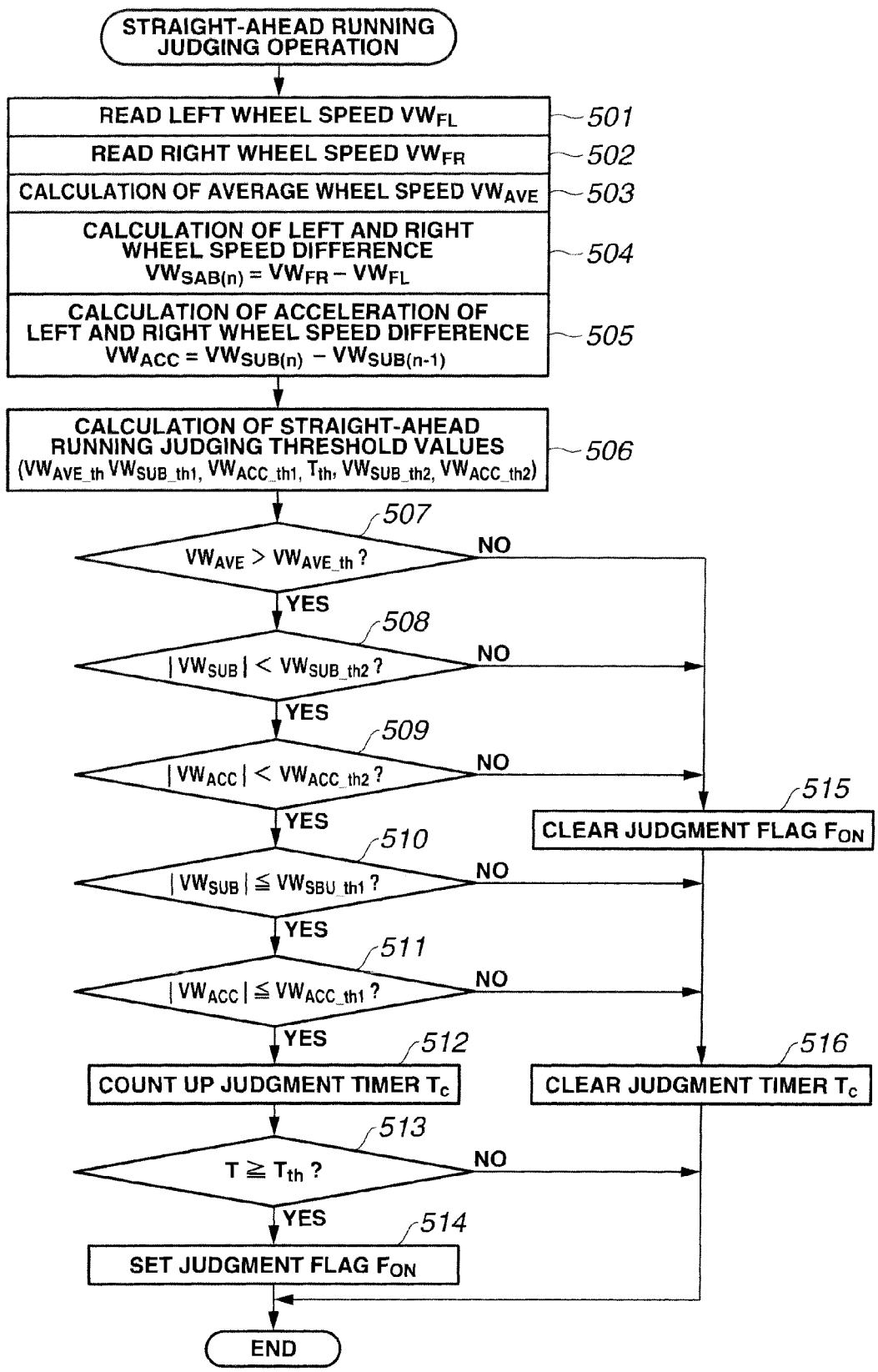
FIG. 15 is a flowchart showing a third variation of the straight-ahead running judging operation in the control operation of the pump apparatus shown in FIG. 5.

FIG. 15 shows a third variation according to the first embodiment. In this third variation, the straight-ahead running judgment operation is different from that of the first embodiment. In particular, the straight-ahead running judgment is not performed by directly reading steering angle θ like the first embodiment. Steering angle θ is presumed from speed difference $VW_{SUB}$ between the left and right steered wheels, and the straight-ahead running judgment is performed.

In this third variation, at step S501, straight-ahead running judging section 60 reads, from brake control apparatus 36, a wheel speed $VW_{FL}$ of the left forward wheel which is a steered wheel. Subsequently to step S501, at step S502, straight-ahead running judging section 60 reads a wheel speed $VW_{FR}$ of the right forward wheel which is the steered wheel. Subsequently to step S502, at step S503, straight-ahead running judging section 60 calculates an average wheel speed $VW_{AVE}$ by averaging these wheel speeds $VW_{FL}$ and $VW_{FR}$. Subsequently to step S503, at step S504, straight-ahead running judging section 60 calculates a left and right wheel speed difference $VW_{SUB(n)}$ ($=VW_{FL}-VW_{FR}$) by a difference between wheel speeds $VW_{FL}$ and $VW_{FR}$. Subsequently to step S504, at step S505, straight-ahead running judging section 60 calculates a left and right wheel speed difference acceleration $VW_{ACC}$ ($=VW_{SUB(n)}-VW_{SUB(n-1)}$) based on this calculated left and right wheel speed difference $VW_{SUB(n)}$. This average wheel speed $VW_{AVE}$ is used for presuming vehicle speed V according to the first embodiment.

Subsequently to step S505, at step S506, straight-ahead running judging section 60 calculates threshold values $VW_{AVE\_th}$, $VW_{SUB\_th1}$, $VW_{ACC\_th1}$, $T_{th}$, $VW_{SUB\_th2}$ and $VW_{ACC\_th2}$ for using a straight-ahead running judgment described later. Threshold value $VW_{AVE\_th}$ is a predetermined average wheel speed which is a reference value for the straight-ahead running judgment. Threshold value $VW_{SUB\_th1}$ is a predetermined wheel speed difference which is a reference value for the straight-ahead running judgment. Threshold value $VW_{SUB\_th2}$ is a predetermined cancel threshold value of the left and right wheel speed difference which is a reference value to cancel the straight-ahead running judgment. The threshold value $VW_{ACC\_th1}$ is a predetermined wheel speed difference acceleration which is a reference value for the straight-ahead running judgment. Threshold value $VW_{ACC\_th2}$ is a predetermined cancel threshold value of the left and right wheel speed difference acceleration which is a reference value to cancel the straight-ahead running judgment.

Subsequently to step S506, at step S507, straight-ahead running judging section 60 judges whether or not average wheel speed $VW_{AVE}$ is greater than predetermined wheel speed $VW_{AVE\_th}$ (average wheel speed $VW_{AVE}$>predetermined wheel speed $VW_{AVE\_th}$) for performing the straight-ahead running judgment based on average wheel speed $VW_{AVE}$ corresponding to vehicle speed V of the first embodiment. When the answer of step S507 is affirmative (YES), the process proceeds to step S508. At step S508, straight-ahead running judging section 60 judges whether or not absolute value $|VW_{SUB}|$ of the left and right wheel speed difference is smaller than predetermined cancel threshold value $VW_{SUB\_th2}$ (absolute value $|VW_{SUB}|$ of the left and right wheel speed difference<predetermined cancel threshold value $VW_{SUB\_th2}$), based on a wheel speed difference threshold value map (not shown). When the answer of step S508 is affirmative (YES), the process proceeds to step S509. At step S509, straight-ahead running judging section 60 judges whether or not absolute value $|VW_{ACC}|$ of the left and right wheel speed difference acceleration is smaller than predetermined cancel threshold value $VW_{ACC\_th2}$ (absolute value $|VW_{ACC}|$ of the left and right wheel speed difference acceleration<predetermined cancel threshold value $VW_{ACC\_th2}$), based on a wheel speed difference acceleration map (not shown). On the other hand, when one of the answers of steps S507-S509 is negative (NO), the process proceeds to step S515. At step S515, straight-ahead running judging section 60 clears judgment flag $F_{ON}$ to cancel the straight-ahead running judgment.

When the answer of step S509 is affirmative (YES), the process proceeds to step S510. At step S510, straight-ahead running judging section 60 judges whether or not absolute value $|VW_{SUB}|$ of the left and right wheel speed difference is equal to or smaller than predetermined wheel speed difference $VW_{SUB\_th1}$ (absolute value $|VW_{SUB}|$ of the left and right wheel speed difference≤predetermined wheel speed difference $VW_{SUB\_th1}$) based on the wheel speed difference threshold value map for the straight-ahead running judgment based on left and right wheel speed difference $VW_{SUB}$. When the answer of step S510 is affirmative (YES), the process proceeds to step S511. At step S511, straight-ahead running judging section 60 judges whether or not absolute value $|VW_{ACC}|$ of the left and right wheel speed difference acceleration is equal to or smaller than predetermined wheel speed difference acceleration $VW_{ACC\_th1}$ (absolute value $|VW_{ACC}|$ of the left and right wheel speed difference acceleration≤predetermined wheel speed difference acceleration $VW_{ACC\_th1}$) based on the wheel speed difference acceleration map for the straight-ahead running judgment based on left and right wheel speed difference acceleration $VW_{ACC}$. When the answer of step S511 is affirmative (YES) (the vehicle is in the straight-ahead running state), the process proceeds to step S512. At step S512, straight-ahead running judging section 60 counts up judgment timer $T_c$. When the answer of step S510 or S511 is negative (NO) (the vehicle is not in the straight-ahead running state), the process proceeds to step S516. At step S516, straight-ahead running judging section 60 clears judgment timer $T_c$. In this ways, the straight-ahead running judgment according to this third variation considers left and right wheel speed difference $VW_{SUB}$ and left and right wheel speed difference acceleration $VW_{ACC}$ in addition to average wheel speed $VW_{AVE}$.

Subsequently to step S512 (after the count-up of the judgment timer $T_c$), at step S513, straight-ahead running judging section 60 judges whether or not accumulation time T of the judgment timer $T_c$ is equal to or greater than predetermined time period $T_{th}$ (accumulation time T of the judgment timer $T_c \geq$ predetermined time period $T_{th}$) based on the judgment time map (cf. FIG. 10) for judging the duration time of the straight-ahead running state. When the answer of step S513 is affirmative (YES), the judgment of the straight-ahead running state is determined, and the process proceeds to step S514. At step S514, straight-ahead running judging section 60 sets judgment flag $F_{ON}$ to 1. Subsequently to step S514, the process is finished. On the other hand, when the answer of step S513 is negative (NO), the judgment of the straight-ahead running state is not determined, and the process is finished.

In this way, in this third variation, it is possible to sense the steered state by left and right wheel speed difference $V_{SUB}$ of the steered wheels. Accordingly, it is possible to perform the straight-ahead running judgment, for example, in a vehicle having no steering wheel, and to attain the effects identical to the first embodiment.

Figure 16:
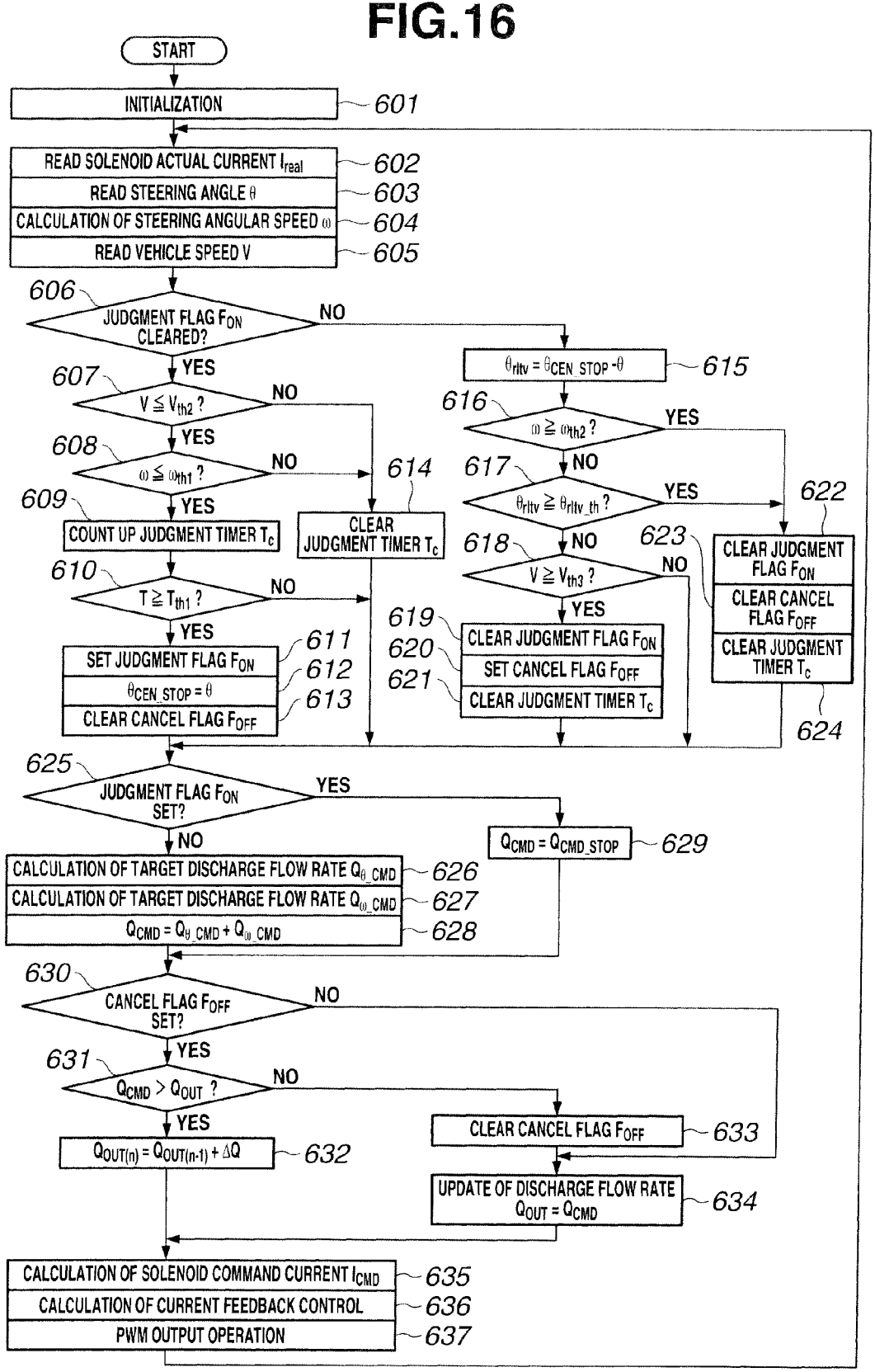
FIG. 16 is a flowchart showing a control operation of a pump apparatus according to a second embodiment of the present invention.
Figure 17:
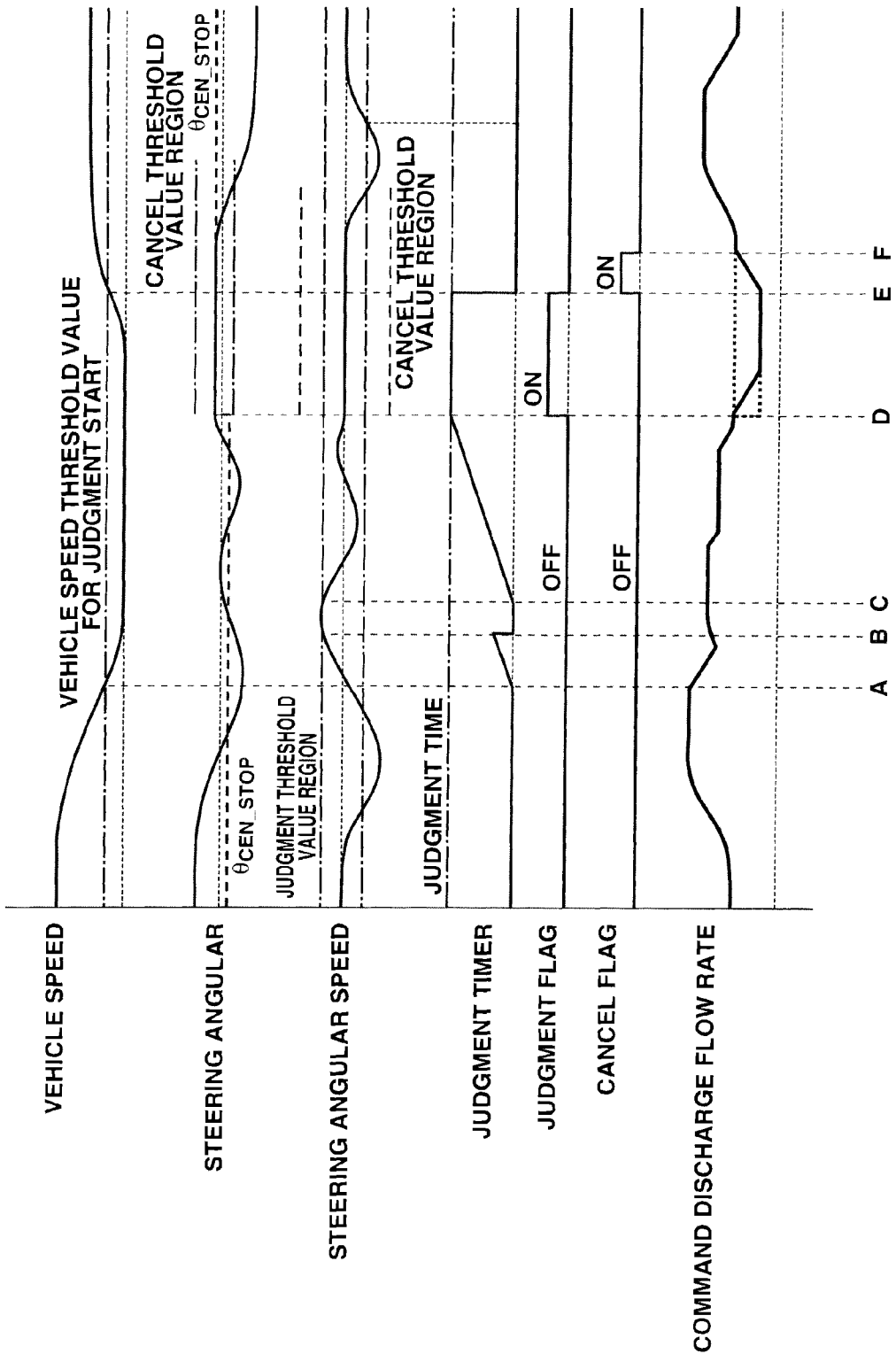
FIG. 17 is a time chart of the control operation of the pump apparatus shown in FIG. 16.

FIG. 16 is a flowchart showing a control operation of a pump apparatus according to a second embodiment of the present invention. FIG. 17 is a time chart of the control operation of the pump apparatus shown in FIG. 16. In this pump apparatus according to the second embodiment, the control operation of solenoid valve 16 is different from that of the first embodiment. In particular, the control operation is performed so as to suppress the eccentricity of cam ring 14 under a predetermined condition when the vehicle is reaccelerated after the stop in the steered state so as to shift to the straight-ahead running state (hereinafter, referred to as "a shift state to the straight-ahead running").

As shown in FIG. 16, at step S601, MPU 50 performs initialization. Subsequently to step S601, at step S602, MPU 50 reads actual supply current $I_{real}$ flowing through coil 16a. Subsequently to step S602, at step S603, MPU 50 reads steering angle θ. Subsequently to step S603, at step S604, MPU 50 calculates steering angular speed ω based on steering angle θ. Subsequently to step S604, at step S605, MPU 50 reads vehicle speed V.

Subsequently to step S605, at step S606, MPU 50 judges whether or not judgment flag $F_{ON}$ is cleared. When the answer of step S606 is affirmative (YES) (judgment flag $F_{ON}$ is cleared), the process proceeds to step S607. At step S607, MPU 50 judges whether or not vehicle speed V is equal to or smaller than second predetermined vehicle speed $V_{th2}$ (<first predetermined vehicle speed $V_{th1}$) (vehicle speed V≤second predetermined vehicle speed $V_{th2}$). When the answer of step S607 is affirmative (YES), the process proceeds to step S608. At step S608, MPU 50 judges whether or not steering angular speed ω is equal to or smaller than first predetermined angular speed $ω_{th1}$ (steering angular speed ω≤first predetermined angular speed $ω_{th1}$). When the answer of step S608 is affirmative (YES), that is, when the vehicle is in a first state (corresponding to the stop state of the vehicle), the process proceeds to step S609. At step S609, MPU 50 counts up judgment timer $T_c$. When the answer of step S607 or step S608 is negative (NO) (the vehicle is not in the first state), the process proceeds to step S614. At step S614, MPU 50 clears judgment timer $T_c$. Second predetermined vehicle speed $V_{th2}$ is a threshold value of the vehicle speed which is a reference value to judge whether or not the vehicle is in the first state that is the vehicle stop state. Second predetermined vehicle speed $V_{th2}$ corresponds to a second predetermined vehicle speed. Moreover, first predetermined steering angular speed $ω_{th1}$ is a threshold value of the steering angle which is a reference value to judge whether or not the vehicle is in the first state that is the vehicle stop state. First predetermined steering angular speed $ω_{th1}$ corresponds to a predetermined steering angular speed. Subsequently to step S609 (the count-up of judgment timer $T_c$), at step S610, MPU 50 judges whether or not accumulation time T of judgment timer $T_c$ is equal to or greater than predetermined time period $T_{th}$ (accumulation time T of judgment timer $T_c$≥predetermined time period $T_{th}$) based on the judgment time map (not shown), for judging the duration time of the vehicle stop state (the first state). When the answer of step S610 is affirmative (YES), the process proceeds to step S611. At step S611, MPU 50 sets judgment flag $F_{ON}$ to 1, and the judgment that the vehicle is in the first state is determined. When the answer of step S610 is negative (NO), the judgment that the vehicle is in the first state is not determined, and the process proceeds to step S625. Subsequently to step S611 (after the set of judgment flag $F_{ON}$ to 1), the process proceeds to step S612. At step S612, MPU 50 stores current steering angle as immediately preceding steering angle $θ_{CEN\_STOP}$ ($θ_{CEN\_STOP}$=θ). Subsequently to step S612, at step S613, MPU 50 clears cancel flag $F_{OFF}$. Subsequently to step S613, the process proceeds to step S625.

On the other hand, when the answer of step S606 is negative (NO) (the judgment flag $F_{ON}$ is not cleared), the process proceeds to step S615. At step S615, MPU 50 calculates a relative steering angle $θ_{rltv}$ (=$θ_{CEN\_STOP}$−θ) by a difference between current steering angle θ and immediately preceding steering angle $θ_{CEN\_STOP}$ when the judgment flag $F_{ON}$ is set. Subsequently to step S615, at step S616, MPU 50 judges whether or not steering angular speed ω is equal to or greater than second predetermined steering angular speed $ω_{th2}$ (steering angular speed ω≥second predetermined steering angular speed $ω_{th2}$). When the answer of step S616 is negative (NO), the process proceeds to step S617. At step S617, MPU 50 judges whether or not steering angle $θ_{rltv}$ is equal to or greater than predetermined relative steering angle $θ_{rltv\_th}$ (steering angle $θ_{rltv}$≥predetermined relative steering angle $θ_{rltv\_th}$). When the answer of step S617 is negative (NO), the process proceeds to step S618. At step S618, MPU 50 judges whether or not vehicle speed V is equal to or greater than third predetermined vehicle speed $V_{th3}$ (vehicle speed V≥third predetermined vehicle speed $V_{th3}$). On the other hand, when the answer of step S616 or step S617 is affirmative (YES), the vehicle is not in the shift state to the straight-ahead running state, and the process proceeds to steps S622-S624. At steps S622-S624, MPU 50 clears judgment flag $F_{ON}$, cancel flag $F_{OFF}$ and judgment timer $T_c$. Subsequently to step S624, the process proceeds to step S625 described later. Second predetermined steering angular speed $ω_{th2}$ is a threshold value of the steering angular speed which is a reference value to judge whether or not the vehicle is in a second state described later. Predetermined relative steering angle $θ_{rltv\_th}$ is a threshold value of the relative steering angle which is a reference value to judge whether or not the vehicle is in the second state described later. Third predetermined vehicle speed $V_{th3}$ is a threshold value of the vehicle speed which is a reference value to judge whether or not the vehicle is reaccelerated by a predetermined amount or more after the vehicle stop. When the answer of step S618 is affirmative (YES), that is, when the vehicle is in the second state which corresponds to the shift state to the straight-ahead running, the process proceeds to step S619. At step S619, MPU 50 clears judgment flag $F_{ON}$. Subsequently to step S619, MPU 50 sets cancel flag $F_{OFF}$ at step S620. Subsequently to step S620, MPU 50 clears judgment timer $T_c$ at step S621. Subsequently to step S621, the process proceeds to step S625 described later. On the other hand, when the answer of step S618 is negative (NO), the steps S619-S621 are omitted, and the process proceeds to step S625. In this way, when the condition of step S616 and the condition of step S617 are not satisfied and also the condition of step S618 is satisfied, that is, for example, when the vehicle is stopped in the steered state for the left or right turn and so on, and then shifted to the straight-ahead running state while being accelerated, the control operation to suppress the eccentricity of cam ring 14 is not immediately canceled. Moreover, when the conditions of steps S616 and S617 are not satisfied and also the condition of step S618 is not satisfied, that is, when the steering amount is gradually decreased and vehicle speed V does not sufficiently increase to the predetermined speed (third predetermined vehicle speed $V_{th3}$), that is, when the vehicle is not in the shift state to the straight-ahead running of this embodiment, the control operation to cancel the eccentricity of cam ring 14 is not canceled, and judgment timer $T_c$ is not cleared. The control operation to suppress the eccentricity of cam ring 14 continues (is maintained), and the next judgment is waited. Moreover, when the condition of step S616 or S617 is satisfied, that is, for example, when the vehicle is stopped in the steered state for K-turn when the vehicle is moved into the garage, and then the vehicle continues to move into the garage, the vehicle is not in the second state, and the control operation to suppress the eccentricity of cam ring 14 is canceled.

After the above-described control operation, at step S625, MPU 50 judges whether or not judgment flag $F_{ON}$ is set to 1. When the answer of step S625 is negative (NO) (judgment flag $F_{ON}$ is cleared), the vehicle is not in the first state, and the process proceeds to step S626. At step S626, MPU 50 calculates target discharge flow rate $Q_{\theta\_CMD}$ which is dependent on steering angle θ from the steering angle-target discharge flow rate map (cf. FIG. 6) based on actual steering angle θ read in step S603. Subsequently to step S626, at step S627, MPU 50 calculates target discharge flow rate $Q_{\omega\_CMD}$ which is dependent on steering angular speed ω from the steering angular speed-target discharge flow rate map (FIG. 7) based on steering angular speed ω calculate at step S604. Subsequently to step S627, is at step S628, MPU 50 calculates target discharge flow rate $Q_{CMD}$ by adding these calculated values $Q_{\theta\_CMD}$ and $Q_{\omega\_CMD}$. On the other hand, when the answer of step S625 is affirmative (YES) (judgment flag $F_{ON}$ is set), the vehicle is in the first state, and the process proceeds to step S629. Target discharge flow rate $Q_{CMD}$ is not calculated based on actual steering angle θ and actual steering angular speed ω. At step S629, MPU 50 sets target discharge flow rate $Q_{CMD}$ to the predetermined minimum flow rate $Q_{CMD\_STOP}$, like the first embodiment. Subsequently to step S628 or S629 (after target discharge flow rate $Q_{CMD}$ is calculated or set), MPU 50 judges whether or not cancel flag $F_{OFF}$ is set at step S630. When the answer of step S630 is affirmative (YES), the vehicle is in the second state, and the process proceeds to step S631. At step S631, MPU 50 judges whether or not target discharge flow rate $Q_{CMD}$ is greater than actual discharge flow rate $Q_{OUT}$ (target discharge flow rate $Q_{CMD}$>actual discharge flow rate $Q_{OUT}$). When the answer of step S630 is negative (NO), the vehicle is not in the second state, and the process proceeds to step S634. Predetermined flow rate $Q_{CMD\_STOP}$ is set to a discharge flow rate based on the inherent discharge flow amount smaller than the minimum inherent discharge amount when the control operation to suppress the eccentricity of cam ring 14 is not performed.

Next, when the answer of step S631 is affirmative (YES), it is unnecessary to rapidly largely increase the discharge flow rate of pump 10 after the driving state of the vehicle is shifted to the second state, that is, the straight-ahead running state. Accordingly, subsequently to the affirmative answer of step S631, the process proceeds to step S632. At step S632, MPU 50 performs a gradual increasing operation ($Q_{OUT(n)}$= $Q_{OUT(n-1)}$+ΔQ) of the discharge flow rate to determine actual discharge flow rate $Q_{OUT(n)}$ by adding minute flow rate ΔQ to the previous value $Q_{OUT(n-1)}$ of the actual discharge flow rate, so as to gradually increase the discharge flow rate of pump 10. Subsequently to step S632, the process proceeds to step S635 described later. On the other hand, when the answer of step S631 is negative (NO), the discharge flow rate of pump 10 is sufficiently small, and it is unnecessary to perform the control operation to suppress the eccentricity of cam ring 14. Accordingly, subsequently to the negative answer of step S631, the process proceeds to step S633. At step S633, MPU 50 clears cancel flag $F_{OFF}$. Subsequently to step S633, at step S634, MPU 50 updates actual discharge flow rate $Q_{OUT}$ so as to satisfy actual discharge flow rate $Q_{OUT}$=target discharge flow rate $Q_{CMD}$ so as to set the discharge flow rate of pump 10 to necessary and sufficient flow rate. Subsequently to step S634, at step S635, MPU 50 determines command current $I_{CMD}$ supplied to solenoid valve 16 from the discharge flow rate-target current map (cf. FIG. 8) based on actual discharge flow rate $Q_{OUT(n)}$. Subsequently to step S635, at step S636, MPU 50 calculates PWM duty by using the PI control by the difference between this calculated command current $I_{CMD}$ and actual supply current $I_{real}$ flowing through coil 16a. Subsequently to step S636, at step S637, MPU 50 outputs a PWM driving control signal to solenoid valve 16 based on this PWM duty.

The above-described control operation is illustrated with reference to a time chart shown in FIG. 17. At a time A at which vehicle speed V<second predetermined vehicle speed $V_{th2}$ and steering angular speed ω≤first predetermined steering angular speed $\omega_{th1}$ are satisfied in a state in which judgment flag $F_{ON}$ is cleared, the driving state of the vehicle is the first state. Accordingly, judgment timer $T_c$ is counted up at step S609. Then, at a time B at which the steering angular speed ω exceeds first predetermined angular speed $\omega_{th1}$ before the accumulation time T by the count-up of judgment timer $T_c$ exceeds predetermined time $T_{th}$, it is not determined that the driving state of the vehicle is the first state. Judgment timer $T_c$ is cleared at step S614. At a time C at which steering angular speed ω becomes equal to or smaller than first predetermined angular speed $\omega_{th1}$, judgment timer $T_c$ is again counted up. Then, at a time D at which accumulation time T by the count-up by judgment timer $T_c$ becomes equal to or greater than predetermined time $T_{th}$, it is determined that the driving state of the vehicle is the first state. Judgment flag $F_{ON}$ is set to 1 at step S611. Consequently, target discharge flow rate $Q_{CMD}$ is set to the minimum discharge flow rate $Q_{CMD\_STOP}$ at step S629. The discharge flow rate of pump 10 is gradually decreased, and then maintained to the minimal amount. With this, the control operation to suppress the eccentricity of cam ring 14 is performed. While the relative steering angle $\theta_{rltv}$ of the immediately preceding steering angle $\theta_{CEN\_STOP}$ and the current steering angle θ≥the predetermined relative steering angle $\theta_{rltv\_th}$, steering angular speed ω≥second predetermined steering angular speed $\omega_{th2}$, and vehicle speed V<third predetermined vehicle speed $V_{th3}$ are satisfied when judgment flag $F_{ON}$ is set, the control operation to suppress the eccentricity of cam ring 14 is continued (maintained). Then, in this state, at a time E at which vehicle speed V becomes equal to or greater than third predetermined vehicle speed $V_{th3}$, the driving state of the vehicle is shifted from the first state to the second state. Judgment flag $F_{ON}$ and judgment timer $T_c$ are cleared, and cancel flag $F_{OFF}$ is set at steps S619-S621. The control operation to suppress the eccentricity of cam ring 14 is not suddenly canceled. The discharge flow rate of pump 10 is gradually increased by the gradual increase operation of the discharge flow rate at step S632. The control operation to suppress the eccentricity of cam ring 14 is not suddenly canceled. The discharge flow rate of pump 10 is gradually increased by the gradual increase operation of the discharge flow rate at step S632. At a time F at which the actual discharge flow rate $Q_{OUT(n)}$ of pump 10 exceeds target discharge flow rate $Q_{CMD}$ by the gradual increase operation, cancel flag $F_{OFF}$ is cleared at step S633. Actual discharge flow rate $Q_{OUT}$ is updated in accordance with target discharge flow rate $Q_{CMD}$ at step S634. With this, the control operation to suppress the eccentricity of cam ring 14 is finished. The control operation is shifted to the normal eccentricity control operation based on actual steering angle θ and steering angular speed ω.

In this way, in the control operation of this example, while the driving state of the vehicle is the first state in which the vehicle is stopped in the steered state, target discharge flow rate $Q_{CMD}$ is set to predetermined discharge flow rate $Q_{CMD\_STOP}$. Accordingly, the eccentricity of cam ring 14 is suppressed, like the first embodiment. As to the cancel of the judgment of the first state, when the vehicle is shifted to the straight-ahead running state after the vehicle is stopped in the steered state during the predetermined time period $T_{th}$ or more, that is, when the driving state of the vehicle is shifted to the second state after the first state continues during predetermined time period $T_{th}$ or more, the much discharge flow rate is not suddenly needed. Therefore, the eccentric amount of cam ring 14 is controlled so as to gradually increase the discharge flow rate of pump 10. On the other hand, when the driving state of the vehicle is not shifted from the first state to the second state and the steered state continues, the eccentric amount of cam ring 14 is controlled so as to discharge the flow rate in accordance with steering angle θ and steering angular speed ω.

Moreover, in this example, when the vehicle is shifted to the second state after the first state continues during predetermined time period $T_{th}$ or more, solenoid valve 16 is not controlled based on absolute steering angle θ, and solenoid valve 16 is controlled and driven based on relative steering angle $θ_{rltv}$ which is a difference between immediately preceding steering angle $θ_{CEN\_STOP}$ and current steering angle θ. With this, it is possible to generate appropriate steering assist force when the vehicle is again started (accelerated) after the vehicle is stopped in the steered state in which the steering angle θ is generated.

Moreover, in the control operation of this example, when the driving state of the vehicle is shifted from the first state to the second state, the control operation is performed so as to gradually increase command current $I_{CMD}$ supplied to solenoid valve 16. With this, it is possible to suppress the sudden variation of the eccentric amount of cam ring 14 at the shift from the first state to the second state.

Figure 18:
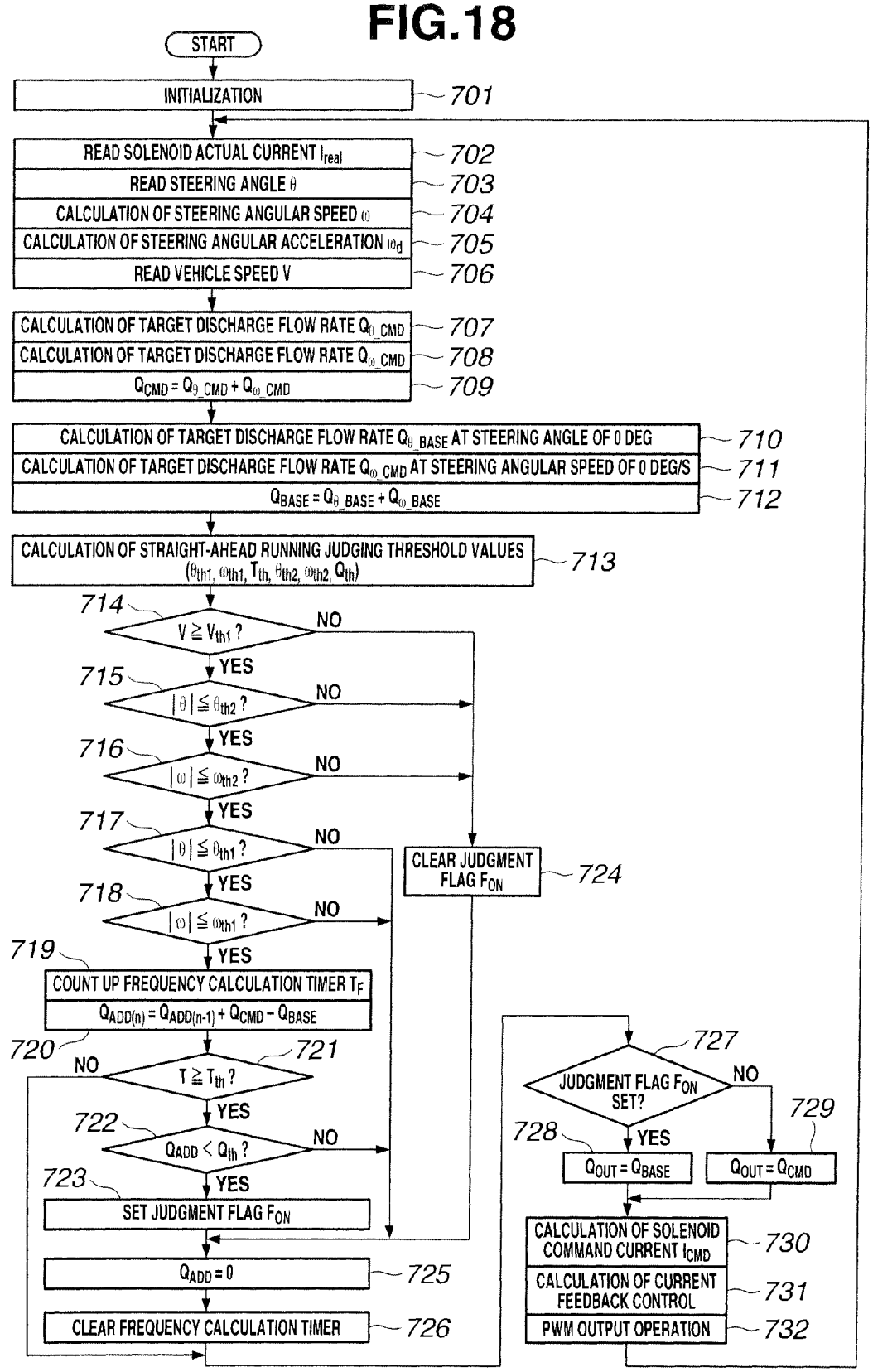
FIG. 18 is a flowchart showing a control operation of a pump apparatus according to a third embodiment of the present invention.

FIG. 18 is a flowchart showing a control operation of a pump apparatus according to a third embodiment of the present invention. In this pump apparatus according to the third embodiment, the control operation of solenoid valve 16 is different from that of the first embodiment. In particular, the straight-ahead running judgment is performed by (in accordance with) a frequency of the steering during a predetermined time period.

In this third embodiment, MPU 50 performs an initialization at step S701. Subsequently to step S701, MPU 50 reads actual supply current $I_{real}$ flowing through coil 16a at step S702. Subsequently to step S702, MPU 50 reads steering angle θ at step S703. Subsequently to step S703, MPU 50 calculates steering angular speed ω based on steering angle θ at step S704. Subsequently to step S704, MPU 50 calculates steering angular acceleration $ω_d$ based on steering angular speed ω at step S705. Subsequently to step S705, MPU 50 reads vehicle speed V at step S706.

Subsequently to step S706, at step S707, MPU 50 determines target discharge flow rate $Q_{θ\_CMD}$ which is dependent on steering angle θ, from the steering angle-target discharge flow rate map (cf. FIG. 6), based on steering angle θ read at step S703. Subsequently to step S707, at step S708, MPU 50 determines target discharge flow rate $Q_{ω\_CMD}$ which is dependent on steering angular speed ω, from the steering angular speed-target discharge flow rate map (cf. FIG. 7), based on steering angular speed ω calculated at step S704. Subsequently to step S708, at step S709, MPU 50 calculates target discharge flow rate $Q_{CMD}$ by adding these calculated values $Q_{θ\_CMD}$ and $Q_{ω\_CMD}$.

Subsequently to step S709, at step S710, MPU 50 calculates a base discharge flow rate $Q_{θ\_BASE}$ which is dependent on steering angle θ of zero (deg), from the steering angle-target discharge flow rate map (cf. FIG. 6). Subsequently to step S710, at step S711, MPU 50 calculates a base discharge flow rate $Q_{ω\_BASE}$ which is dependent on steering angular speed ω of zero (deg/s), from the steering angular speed-target discharge flow rate map (cf. FIG. 7). Subsequently to step S711, at step S712, MPU 50 calculates base discharge flow rate $Q_{BASE}$ by adding these calculated values $Q_{θ\_BASE}$ and $Q_{ω\_BASE}$.

Subsequently to step S712, at step S713, MPU 50 calculates threshold values $θ_{th1}$, $ω_{th1}$, $T_{th}$, $θ_{th2}$, $ω_{th2}$ and $Q_{th}$ which are used for the straight-ahead running judgment, based on vehicle speed V read at step S706. Subsequently to step S713, at step S714, MPU 50 judges whether or not vehicle speed V is equal to or greater than first predetermined vehicle speed $V_{th1}$ (vehicle speed V≥first predetermined vehicle speed $V_{th1}$). When the answer of step S714 is affirmative (YES), the process proceeds to step S715. At step S715, MPU 50 judges whether or not absolute value |θ| of the steering angle is smaller than predetermined cancel threshold value $θ_{th2}$ (absolute value |θ| of the steering angle<predetermined cancel threshold value $θ_{th2}$). When the answer of step S715 is affirmative (YES), the process proceeds to step S716. At step S716, MPU 50 judges whether or not absolute value |ω| of steering angular speed is smaller than predetermined release threshold value $ω_{th2}$ (absolute value |ω| of steering angular speed<predetermined cancel threshold value $ω_{th2}$). On the other hand, when one of the answers of steps S714-S716 is negative (NO), the vehicle is not in the straight-ahead running state, and the process proceeds to step S724. At step S724, MPU 50 clears judgment flag $F_{ON}$.

When the answer of step S716 is affirmative (YES), the process proceeds to step S717. At step S717, MPU 50 judges whether or not absolute value |θ| of the steering angle is equal to or smaller than predetermined steering angle $θ_{th1}$ (absolute value |θ| of the steering angle≤predetermined steering angle $θ_{th1}$). When the answer of step S717 is affirmative (YES), the process proceeds to step S718. At step S718, MPU 50 judges whether or not absolute value |ω| of the steering angular speed is equal to or smaller than predetermined steering angular speed $ω_{th1}$ (absolute value |ω| of the steering angular speed≤predetermined steering angular speed $ω_{th1}$). When the answer of step S718 is affirmative (YES), the straight-ahead running state is presumed (estimated), and the process proceeds to step S719. At step S719, MPU 50 counts up frequency calculating timer $T_F$. Subsequently to step S719, at step S720, MPU 50 calculates discharge flow rate frequency value $Q_{ADD(n)}$ based on discharge flow rate frequency value $Q_{ADD(n)}$=previous value $Q_{ADD(n-1)}$ of the discharge flow rate frequency value+target discharge flow rate $Q_{CMD}$−base discharge flow rate $Q_{BASE}$. On the other hand, when the answer of step S717 or S718 is negative (NO), the vehicle is not in the straight-ahead running state, the process proceeds to step S725 described later. In this case, discharge flow rate frequency value $Q_{ADD}$ is a reference value for the straight-ahead running judgment at step S722 described later. Discharge flow rate frequency value $Q_{ADD}$ is an additional value of discharge flow rates Q according to the frequency of the steering during predetermined time period $T_{th}$.

Subsequently to step S720, at step S721, MPU 50 judges whether or not accumulation time period T is equal to or greater than predetermined time period $T_{th}$ (accumulation time period T≥predetermined time period $T_{th}$) based on a judgment time period map (not shown) so as to judge a duration time of the straight-ahead running state. When the answer of step S721 is affirmative (YES), the process proceeds to step S722. At step S722, MPU 50 judges whether or not discharge flow rate frequency value $Q_{ADD(n)}$ is smaller than a predetermined discharge flow rate frequency value $Q_{th}$ (discharge flow rate frequency value $Q_{ADD(n)}$<predetermined discharge flow rate frequency value $Q_{th}$). On the other hand, when the answer of step S721 is negative (NO) (accumulation time period T of frequency calculation timer $T_F$<predetermined time period $T_{th}$), it is not determined that the vehicle is in the straight-ahead running state, and the process proceeds to step S727 described later. The predetermined discharge flow rate frequency value $Q_{th}$ is an allowable value of discharge flow rate frequency value $Q_{ADD}$ by (at) which it is determined that the vehicle is in the straight-ahead running state. When the answer of step S722 is affirmative (YES), it is determined that the vehicle is in the straight-ahead running state, and the process proceeds to step S723. At step S723, MPU 50 sets judgment flag $F_{ON}$ to 1. On the other hand, when the answer of step S722 is negative (NO), the vehicle is not in the straight-ahead running state, the step S723 is omitted so as not to set judgment flag $F_{ON}$, and the process proceeds to step S725 described later. Subsequently to step S723 or when the answer of step S722 is negative (NO), the process proceeds to step S725. At step S725, MPU 50 sets $Q_{ADD(n)}$ to zero ($Q_{ADD(n)}$=0) so as to clear data of the discharge flow rate frequency value. Subsequently to step S725, at step S726, MPU 50 sets T to zero (T=0) so as to clear the accumulation time period of frequency calculation timer $T_F$.

Subsequently to step S726, at step S727, MPU 50 judges whether or not judgment flag $F_{ON}$ is set to 1. When the answer of step S727 is affirmative (YES) (judgment flag $F_{ON}$ is set to 1), the process proceeds to step S728. At step S728, MPU 50 sets actual discharge flow rate $Q_{OUT}$ to base discharge flow rate $Q_{BASE}$ calculated at step S712, that is, minimum target discharge flow rate ($Q_{OUT}=Q_{BASE}$). When the answer of step S727 is negative (NO) (judgment flag $F_{ON}$ is not set), the process proceeds to step S729. At step S729, MPU 50 sets actual discharge flow rate $Q_{OUT}$ to target discharge flow rate $Q_{CMD}$ which is calculated at step S709, and which is based on actual steering angle θ and actual steering angular speed ω. Subsequently to step S728 or step S729, at step S730, MPU 50 calculates command current $I_{CMD}$ solenoid valve 16, from the discharge flow rate-target current map (cf. FIG. 8), based on actual discharge flow rate $Q_{OUT}$ set at step S728 or S729. Subsequently to step S730, at step S731, MPU 50 calculates PWM duty by using the PI control from a difference between command current $I_{CMD}$ and actual supply current $I_{real}$ flowing through coil 16a. Subsequently to step S731, at step S732, MPU 50 outputs a PWM control signal to solenoid valve 16 based on this PWM duty.

In this way, in this embodiment, when the steering frequency per unit time period is smaller than the predetermined value, it is regarded (presumed) that the vehicle is in the straight-ahead running state. With this, it is possible to suppress the unnecessary swing movement of cam ring 14 when the frequency of the steering is low. Accordingly, the discharge flow rate of the pump is not sensitively increased, like the first embodiment. The energy loss of the pump is decreased. Moreover, it is possible to suppress the abrasion by the needless or unnecessary sliding movement of cam ring 14, and thereby to improve the durability of the pump. Furthermore, like the first embodiment, when steering angle θ and steering angular speed ω become equal to or greater than the predetermined values, that is, when the large steering amount is needed, the discharge flow rate of the pump is rapidly increased based on the normal control operation. Therefore, the responsiveness of the steering is ensured.

The control operation according to the third embodiment employs additional conditions that absolute value |θ| of the steering angle is equal to or smaller than predetermined steering angle $θ_{th1}$, and absolute value |ω| of the steering angular speed is equal to smaller than predetermined steering angular speed $ω_{th1}$. The control operation of this example considers not only vehicle speed V but also angle θ and steering angular speed ω. With this, it is possible to further improve the accuracy of the straight-ahead running judgment.

Moreover, in this example, the control operation of this example employs an additional condition that the conditions of vehicle speed V, steering angle θ and steering angular speed ω continues during predetermined time period $T_{th}$ or more. With this, it is possible to further improve the accuracy of the straight-ahead running judgment.

The present invention is not limited to embodiments described above. For example threshold values such as first predetermined vehicle speed $V_{th1}$, predetermined steering angle $θ_{th1}$, predetermined cancel threshold value $θ_{th2}$, predetermined steering angular speed $ω_{th1}$ and predetermined cancel threshold value $ω_{th2}$ can freely vary in accordance with specification (design) of the pump, specification (design) of the power steering apparatus which employs the pump.

In the above-described embodiments, the pump apparatus is the variable displacement vane pump. However, the present invention is not limited to the pump apparatus using the cam ring or the pump apparatus of the vane type. That is, the present invention is applicable to any pump apparatus which varies and controls the discharge flow rate by using the solenoid.

Moreover, in this embodiments, the eccentric amount of cam ring 14 is controlled by using vehicle speed V as the reference value (based on vehicle speed V). In place of or in addition to vehicle speed V, the eccentric amount of cam ring 14 may be controlled based on the reduction ratio (shift position) from transmission control apparatus 36. In this case, it is also possible to attain the effects identical to the embodiments of the present invention.

In the example according to the present invention, a pump apparatus arranged to supply a hydraulic fluid to a steering apparatus for a vehicle, the pump apparatus includes: a pump housing including a pump element receiving portion; a drive shaft rotatably supported by the pump housing; a pump element received within the pump element receiving portion of the pump housing, and arranged to suck the hydraulic fluid by being rotated by the drive shaft, and to discharge the sucked hydraulic fluid; a cam ring disposed within the pump element receiving portion radially outside the pump element, and arranged to be moved so that a center of cam ring is eccentric to a center of the drive shaft, and to vary an inherent discharge amount which is a discharge flow rate per one rotation of the pump element, based on the eccentric amount of the cam ring; a steering state sensing section configured to sense or estimate a steering angle, a steering angular speed or a steering angular acceleration, and to output the steering angle, the steering angular speed or the steering angular acceleration as a steering state sensing signal; and a solenoid configured to be controlled to be driven in accordance with a variation of a current amount controlled in accordance with the steering state sensing signal and a vehicle speed, and to control the eccentric amount of the solenoid, the solenoid being configured to be controlled to suppress the eccentric amount of the cam ring so as to decrease the inherent discharge amount with respect to the steering state sensing signal when the vehicle speed is equal to or greater than a first predetermined vehicle speed, relative to the inherent discharge amount when the vehicle speed is smaller than the first predetermined vehicle speed. In this pump apparatus, it is possible to suppress the unnecessary increase of the inherent discharge amount of the pump in a state in which the vehicle speed is relatively high, that is, in a state in which the steering frequency is low, and to decrease the energy loss of the pump.

In the pump apparatus according to the present invention, the steering state sensing section is configured to sense the steering angle; and the solenoid is configured to perform the control operation to suppress the eccentric amount of the cam ring when the vehicle speed is equal to or greater than the first predetermined vehicle speed and the steering angle is equal to or smaller than the predetermined steering angle so as to decrease the inherent discharge amount with respect to the steering state sensing signal, relative to the inherent discharge amount when the vehicle speed is smaller than the first predetermined vehicle speed or when the steering angle is greater than the predetermined steering angle. In this pump apparatus, the control operation is performed based on the vehicle speed and also the steering angle. With this, it is possible to judge, by the higher accuracy, the state in which the increase of the inherent discharge amount of the pump is unnecessary, relative to a case in which only the vehicle speed is considered.

In the pump apparatus according to the present invention, the steering state sensing section is configured to sense the steering angle, and to calculate the steering angular speed based on the steering angle; and the solenoid is configured to perform the control operation to suppress the eccentricity of the cam ring when the vehicle speed is equal to or greater than the first predetermined vehicle speed, the steering angle is equal to or smaller than the predetermined steering angle, and the steering angular speed is equal to or smaller than the predetermined steering angular speed so as to decrease the inherent discharge amount with respect to the steering state sensing signal, relative to the inherent discharge amount when the vehicle speed is smaller than the first predetermined vehicle speed, the steering angle is greater than the predetermined steering angle, and the steering angular speed is greater than the predetermined steering angular speed. In this pump apparatus, the control operation is performed based on the vehicle speed, the steering angle and also the steering angular speed. With this, it is possible to judge, by the higher accuracy, the state in which the increase of the inherent discharge amount of the pump is unnecessary, relative to a case in which the vehicle speed and the steering angle are considered.

In the pump apparatus according to the present invention, the solenoid is configured to control the eccentric amount of the cam ring when a state in which the vehicle speed is equal to or greater than the first predetermined vehicle speed, the steering angle is equal to or smaller than the predetermined steering angle, and the steering angular speed is equal to or smaller than the predetermined steering angular speed continues during a predetermined time period, so that the inherent discharge amount with respect to the steering state sensing signal is smaller than the inherent discharge amounts when the vehicle speed is smaller than the first predetermined vehicle speed, the steering angle is greater than the predetermined steering angle, or the steering angular speed is greater than the predetermined steering angular speed. In this pump apparatus, it is judged that the increase of the inherent discharge amount of the pump is unnecessary by the additional condition that the conditions of the vehicle speed and the steering angle are satisfied during the predetermined time period and more. With this, it is possible to further improve the accuracy of the judgment.

In the pump apparatus according to the present invention, the solenoid is configured to stop the control operation to suppress the eccentric amount of the cam ring when the vehicle speed becomes smaller than the first predetermined vehicle speed, when the steering angle becomes greater than the predetermined steering angle, or when the steering angular speed becomes greater than the predetermined steering angular speed. In this pump apparatus, the control operation to suppress the eccentricity of the cam ring is rapidly stopped under the predetermined condition, the control operation is shifted to the normal control operation. With this, it is possible to improve the steering feeling when the vehicle is turned (rotated) from the straight-ahead running state.

In the pump apparatus according to the present invention, the vehicle includes a collision avoidance system configured to give a caution to a driver when a distance between the vehicle, and another vehicle or an obstacle which is forward of the vehicle in a vehicle running direction is equal to or smaller than a predetermined value; and the solenoid is configured to stop the control operation to suppress the eccentricity of the cam ring when the collision avoidance system is activated. In this pump apparatus, the control operation is performed based on (with reference to) the distance between the own (host) vehicle, and the another vehicle or the obstacle forward of the vehicle. With this, it is possible to rapidly increase the discharge flow rate of the pump based on the normal control operation when the sudden steering is needed for the approach to the another vehicle or the obstacle forward of the vehicle, and to improve the responsiveness of the steering for the avoidance of the danger and so on.

In the pump apparatus according to the present invention, the solenoid is configured to perform the control operation to suppress the eccentricity of the cam ring so that the inherent discharge amount when the control operation to suppress the eccentricity of the cam ring is performed is smaller than a minimum value of the inherent discharge amount when the control operation to suppress the eccentricity of the cam ring is not performed. In this pump apparatus, the inherent discharge amount while the control operation to suppress the eccentricity of the cam ring is performed is smaller than the minimum inherent discharge amount while the control operation to suppress the eccentricity of the cam ring is not performed. With this, it is possible to further decrease the load to the pump, and to further improve the energy saving effect of the pump.

In the pump apparatus according to the present invention, the steering state sensing section is configured to sense the steering angle, and to calculate the steering angular speed based on the steering angle; and the solenoid is configured to be controlled, when the vehicle is shifted to a second state in which the variation of the steering angle is generated after a first state in which the vehicle speed is equal to or smaller than a second predetermined vehicle speed smaller than the first predetermined vehicle speed and the steering angular speed is equal to or smaller than a predetermined steering angular speed continues during a predetermined time period, based on a difference between the steering angle in the first state and the steering angle in the second state. In this pump apparatus, the solenoid is controlled and driven based on the difference between the steering angle in the first state and the steering angle in the second state when the vehicle is shifted to the second state after the first state continues during the predetermined time period or more. With this, it is possible to generate appropriate steering assist force when the vehicle is again started after the vehicle is stopped in the steered state in which the steering angle is generated.

In the pump apparatus according to the present invention, the current amount to the solenoid is gradually increased when the vehicle is shifted from the first state to the second state. In this pump apparatus, the current amount of the solenoid is controlled so as to gradually increase when the vehicle is shifted from the first state to the second state. With this, it is possible to suppress the sudden increase of the eccentric amount of the cam ring.

In the pump apparatus according to the present invention, the steering state sensing section is configured to estimate the steering angle, the steering angular speed or the steering angular acceleration based on a rotational speed difference between left and right wheels of the vehicle. In this pump apparatus, it is possible to sense the steered state by the difference of the rotational speeds of the left and right wheels, and to control the eccentric amount of the cam ring in accordance with the steered state.

In the pump apparatus according to the present invention, the solenoid is configured to control the eccentric amount of the cam ring based on a reduction ratio of a transmission of the vehicle. In this pump apparatus, it is possible to estimate the running state of the vehicle by the reduction ratio (the shift position) of the transmission of the vehicle, and to control the eccentric amount of the cam ring in accordance with the running state of the vehicle.

The entire contents of Japanese Patent Application No. 2009-145934 filed Jun. 19, 2009 are incorporated herein by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A pump apparatus arranged to supply a hydraulic fluid to a steering apparatus for a vehicle, the pump apparatus comprising:
a pump housing including a pump element receiving portion;
a drive shaft rotatably supported by the pump housing;
a pump element received within the pump element receiving portion of the pump housing, and arranged to suck the hydraulic fluid by being rotated by the drive shaft, and to discharge the sucked hydraulic fluid;
a cam ring disposed within the pump element receiving portion radially outside the pump element, and arranged to be moved so that a center of the cam ring is eccentric to a center of the drive shaft, and to vary an inherent discharge amount which is a discharge flow rate per one rotation of the pump element, based on an eccentric amount of the cam ring;
a steering state sensing section configured to sense or estimate a steering angle, a steering angular speed or a steering angular acceleration, and to output the steering angle, the steering angular speed or the steering angular acceleration as a steering state sensing signal; and
a solenoid configured to be controlled in accordance with a variation of a current amount controlled in accordance with the steering state sensing signal and a vehicle speed, and to control the eccentric amount of the cam ring, the solenoid configured to suppress the eccentric amount of the cam ring so as to decrease the inherent discharge amount with respect to the steering state sensing signal when a state in which the vehicle speed is equal to or greater than a first predetermined vehicle speed and the steering angle is equal to or smaller than a first predetermined steering angle continues during a predetermined time period, relative to the inherent discharge amount when the vehicle speed is smaller than the first predetermined vehicle speed, or the steering angle is greater than the first predetermined steering angle,
wherein a control operation to suppress the eccentric amount of the cam ring is stopped when the vehicle speed becomes smaller than the first predetermined vehicle speed, or when the steering angle becomes greater than a second predetermined steering angle that is greater than the first predetermined steering angle during the control operation to suppress the eccentric amount of the cam ring.

2. The pump apparatus as claimed in claim 1, wherein the steering state sensing section is configured to sense the steering angle; and the solenoid is configured to perform the control operation to suppress the eccentric amount of the cam ring when the vehicle speed is equal to or greater than the first predetermined vehicle speed and the steering angle is equal to or smaller than a predetermined steering angle so as to decrease the inherent discharge amount with respect to the steering state sensing signal, relative to the inherent discharge amount when the vehicle speed is smaller than the first predetermined vehicle speed or when the steering angle is greater than the predetermined steering angle.

3. The pump apparatus as claimed in claim 1, wherein the steering state sensing section is configured to sense the steering angle, and to calculate the steering angular speed based on the steering angle; and the solenoid is configured to perform the control operation to suppress the eccentric amount of the cam ring when the vehicle speed is equal to or greater than the first predetermined vehicle speed, the steering angle is equal to or smaller than a predetermined steering angle, and the steering angular speed is equal to or smaller than a predetermined steering angular speed so as to decrease the inherent discharge amount with respect to the steering state sensing signal, relative to the inherent discharge amount when the vehicle speed is smaller than the first predetermined vehicle speed, the steering angle is greater than the predetermined steering angle, and the steering angular speed is greater than the predetermined steering angular speed.

4. The pump apparatus as claimed in claim 3, wherein the solenoid is configured to control the eccentric amount of the cam ring when a state in which the vehicle speed is equal to or greater than the first predetermined vehicle speed, the steering angle is equal to or smaller than the predetermined steering angle, and the steering angular speed is equal to or smaller than the predetermined steering angular speed continues during a predetermined time period so as to decrease the inherent discharge amount with respect to the steering state sensing signal, relative to the inherent discharge amount when the vehicle speed is smaller than the first predetermined vehicle speed, the steering angle is greater than the predetermined steering angle, or the steering angular speed is greater than the predetermined steering angular speed.

5. The pump apparatus as claimed in claim 1, wherein the solenoid is configured to stop the control operation to suppress the eccentric amount of the cam ring when the vehicle speed becomes smaller than the first predetermined vehicle speed, when the steering angle becomes greater than the predetermined steering angle, or when the steering angular speed becomes greater than the predetermined steering angular speed.

6. The pump apparatus as claimed in claim 1, wherein the vehicle includes a collision avoidance system configured to give a caution to a driver when a distance between the vehicle and another vehicle or an obstacle ahead of the vehicle in a vehicle running direction is equal to or smaller than a predetermined value; and wherein the solenoid is configured to stop the control operation to suppress the eccentric amount of the cam ring when the collision avoidance system is activated.

7. The pump apparatus as claimed in claim 1, wherein the solenoid is configured to perform the control operation to suppress the eccentric amount of the cam ring so that the inherent discharge amount when the control operation to suppress the eccentric amount of the cam ring is performed is smaller than a minimum value of the inherent discharge amount when the control operation to suppress the eccentric amount of the cam ring is not performed.

8. The pump apparatus as claimed in claim 1, wherein the steering state sensing section is configured to sense the steering angle, and to calculate the steering angular speed based on the steering angle; and the solenoid is configured to be controlled, when the vehicle is shifted to a second state in which variation of the steering angle is generated after a first state in which the vehicle speed is equal to or smaller than a second predetermined vehicle speed smaller than the first predetermined vehicle speed and the steering angular speed is equal to or smaller than a predetermined steering angular speed continues during a predetermined time period, based on a difference between the steering angle in the first state and the steering angle in the second state.

9. The pump apparatus as claimed in claim 8, wherein the current amount to the solenoid is gradually increased when the vehicle is shifted from the first state to the second state.

10. The pump apparatus as claimed in claim 1, wherein the steering state sensing section is configured to estimate the steering angle, the steering angular speed or the steering angular acceleration based on a rotational speed difference between left and right wheels of the vehicle.

11. The pump apparatus as claimed in claim 1, wherein the solenoid is configured to control the eccentric amount of the cam ring based on a reduction ratio of a transmission of the vehicle.

* * * * *